United States Patent [19]

Buhrke et al.

[11] Patent Number: 5,012,466
[45] Date of Patent: Apr. 30, 1991

[54] CALL SERVICE INITIALIZATION ARRANGEMENT

[75] Inventors: Rolfe E. Buhrke, Westchester; Robert B. Dianda, Wheaton; Leo R. Katzenstein, Naperville, all of Ill.; Michael B. McClurkan, Little Rock, Ark.; John S. Tsai, Naperville, Ill.

[73] Assignee: AT&T Bell Laboratories, Murray Hill, N.J.

[21] Appl. No.: 449,653

[22] Filed: Dec. 11, 1989

Related U.S. Application Data

[63] Continuation-in-part of Ser. No. 108,249, Oct. 13, 1987, abandoned.

[51] Int. Cl.$^5$ .................................. H04J 3/24
[52] U.S. Cl. ..................... 370/62; 370/110.1
[58] Field of Search .................. 370/58.1–60, 370/62, 86.1, 92, 94.1, 110.1; 379/201, 207, 244, 245, 246

[56] References Cited

U.S. PATENT DOCUMENTS

| | | | |
|---|---|---|---|
| 4,259,549 | 3/1981 | Stehman | 379/244 |
| 4,567,323 | 1/1986 | Lottes et al. | 379/201 |
| 4,720,850 | 1/1988 | Oberlander et al. | 370/62 |
| 4,899,373 | 2/1990 | Lee et al. | 379/207 |

OTHER PUBLICATIONS

B. Bunner et al., "DMS-100: Switching Architecture for ISDN," Telesis vol. 13, No. 3, 1986, p. 19.
CCITT Recommendation Q.921 (1985) "ISDN User–Network Interface Data Link Layer Specification," see section 5.3, pp. 35–40.
CCITT Recommendation Q.931 (1985) "ISDN User–Network Interface Layer 3 Specification," see section 5.1.2.1, pp. 131–132.
CCITT Recommendation I.430 (1985) "ISDN User–Network Interfaces Layer 1 Recommendations," see section 3.2, p. 142, and section 4.2, p. 144.
CCITT Recommendation Q.932 (1988) "Generic Procedures for the Control of ISDN Supplementary Services," see Annex A, pp. 58–63.

Primary Examiner—Douglas W. Olms
Assistant Examiner—Melvin Marcelo
Attorney, Agent, or Firm—R. T. Watland

[57] ABSTRACT

An initialization arrangement is disclosed that allows call services defined in service profiles stored in a switching system to be enabled for individual terminals in a multipoint configuration without requiring assignment of terminal endpoint identifiers or virtual channel identifiers at subscription time. The call services are enabled for a terminal when the terminal transmits two identifiers to the switching system, one identifier defining the terminal and the other identifier defining a service profile. The switching system includes the identifier of the service profile in broadcast messages to address terminals with features defined by that service profile. Two embodiments of the invention are disclosed, one applicable in a narrowband integrated service digital network (ISDN) and the other applicable in a broadband ISDN (BISDN).

18 Claims, 12 Drawing Sheets

FIG. 3
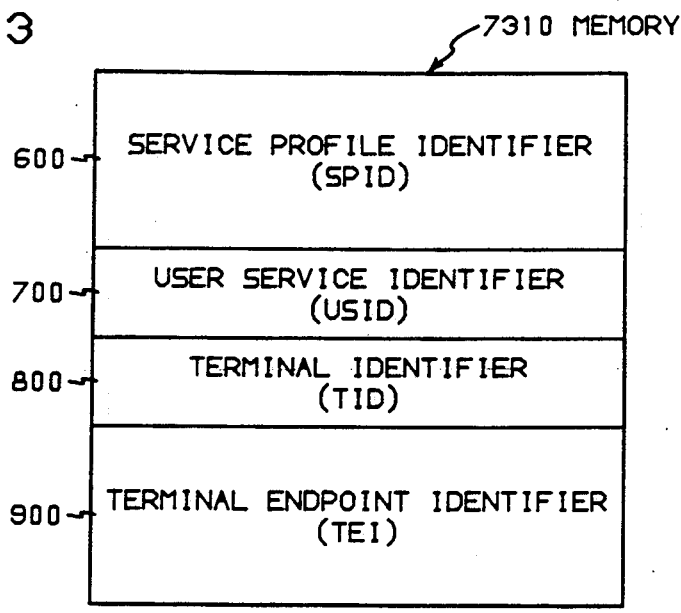
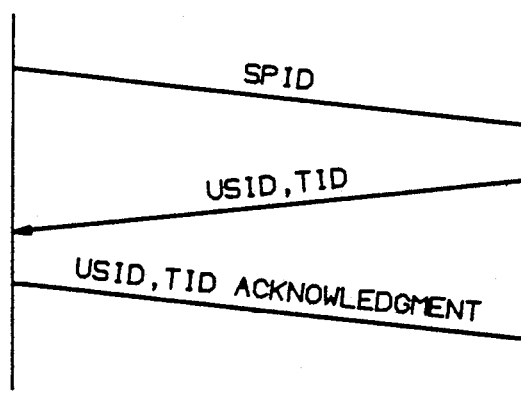
FIG. 4 — TERMINAL INITIATED INITIALIZATION
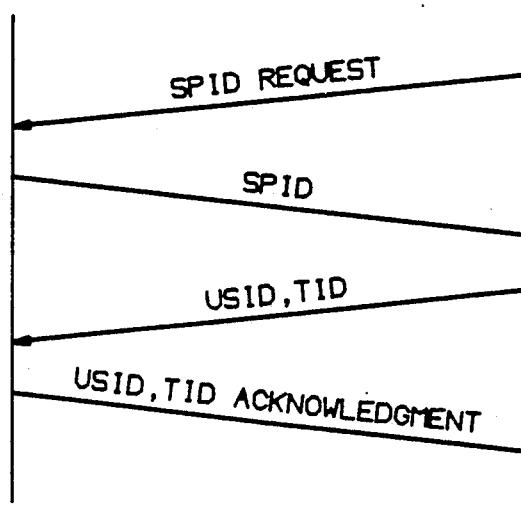
FIG. 5 — SWITCH INITIATED INITIALIZATION

INITIALIZATION: TERMINAL STATE

INITIALIZATION: SWITCH (TERMINAL X) STATES

INITIALIZATION: TERMINAL STATE

FIG. 12
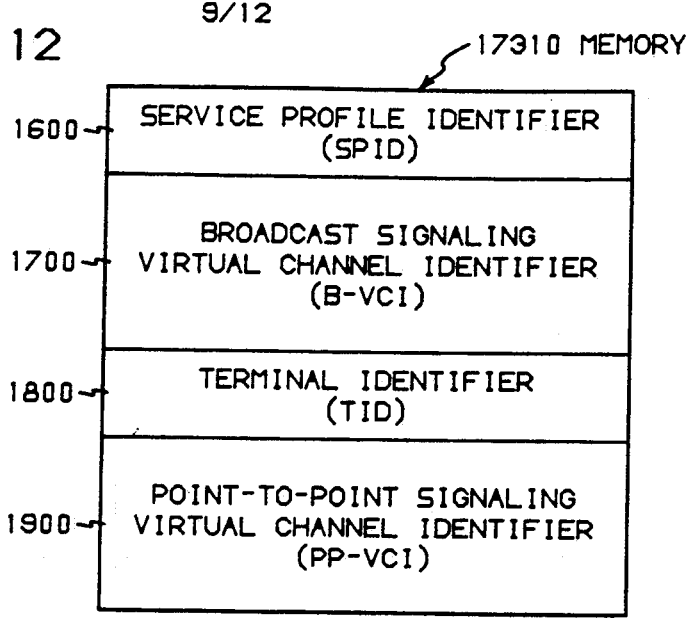
FIG. 13 TERMINAL INITIATED INITIALIZATION
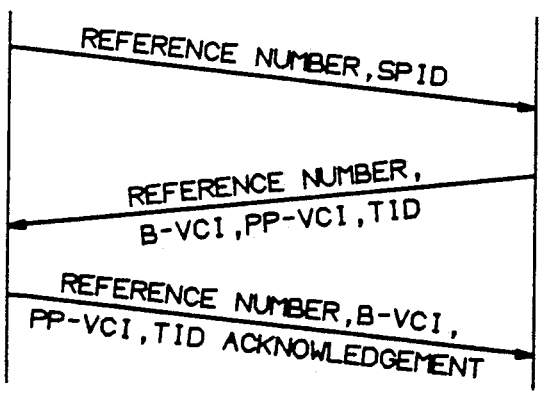
FIG. 14 SWITCH INITIATED INITIALIZATION
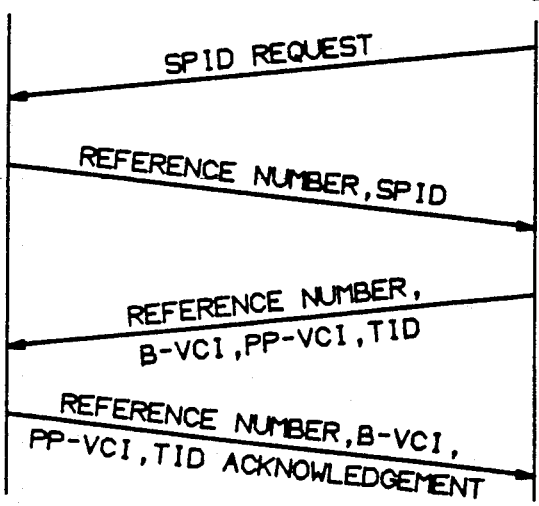

INITIALIZATION: SWITCH (TERMINAL X) STATES

CALL SERVICE INITIALIZATION ARRANGEMENT

CROSS-REFERENCE TO RELATED APPLICATION

This application is a continuation-in-part of the application R. E. Buhrke et al., entitled "Call Service Initialization arrangement", Ser. No. 07/108,249, filed Oct. 13, 1987, abandoned, and assigned to the assignee of the present invention.

TECHNICAL FIELD

This invention relates to telecommunications systems.

BACKGROUND AND PROBLEM

Multiple terminals are connectable to a single digital subscriber line with an Integrated Services Digital Network (ISDN) multipoint interface, defined in Recommendation I.430 of the International Telegraph and Telephone Consultative Committee (CCITT). The multipoint interface allows a customer to add terminals without providing additional wiring to the customer premises. In the past, switching systems stored data defining the call services for a terminal based on an equipment number associated with the line connecting the terminal to the switching system. Per-line service definition is ineffective, however, in a multipoint arrangement because it requires all terminals on a given digital subscriber line to have identical services. A customer, however, may need services to be defined individually for the terminals, requiring for example, differing feature button definitions for terminals on the same digital subscriber line.

One approach to the provision of individually defined services for terminals on a multipoint interface is to assign fixed terminal endpoint identifiers and store service data in the switching system based on these terminal endpoint identifiers. Requiring assignment of fixed terminal endpoint identifiers at subscription time, however, increases the administrative overhead for adding new terminals or moving existing terminals to new locations. In such an arrangement, moving a terminal between digital subscriber lines requires a service order to update the data stored in the switching system. Thus, before adding or moving terminals, a customer submits a service order request and then waits, possibly several days, until the request is processed and the data are updated. Furthermore, since unique terminal endpoint identifiers are required for each terminal, adding terminals, even terminals configured with the same services as another of the customer's terminals, requires a service order.

Moreover, in an arrangement having subscribed-to terminal endpoint identifiers, the switching system is unable to selectively address terminals in a message broadcast to all terminals on a digital subscriber line. CCITT Recommendation Q.931 requires broadcasting of certain messages such as messages offering incoming calls. If a customer requires a terminal to audibly alert for incoming calls to a particular directory number while another terminal on the same digital subscriber line silently alerts for calls to that directory number, conflicting call setup messages are required. The switching system needs a mechanism to address each message to the appropriate terminals while still broadcasting the messages to all terminals on the digital subscriber line. When broadcasting on a digital subscriber line, the switching system must use a global terminal endpoint identifier rather than the individual terminal endpoint identifiers of each terminal. Thus, even when the service information specifies conflicting terminating treatment for different terminals, the switching system is unable to address messages to the appropriate terminals.

In view of the foregoing, a recognized problem in the art is the difficulty of providing conflicting call services for terminals in a multipoint configuration and allowing broadcast messages to contain address information specifying particular terminals based on the services enabled for each terminal while limiting the administrative overhead for adding and moving terminals.

SOLUTION

The foregoing problem is solved and a technical advance is achieved in accordance with the principles of the invention in an exemplary arrangement including a switching system that stores multiple service profiles each defining features subscribed to by a user without requiring assignment of terminal endpoint identifiers at subscription time, and wherein the services defined by a service profile are enabled for a terminal in a multipoint configuration in response to transmission by the terminal of both a first identifier defining the terminal and a second identifier defining a particular service profile for that terminal. Advantageously, the first identifier is assignable by the switching system while the second identifier may be fixed for a given terminal and associated service profile. In this arrangement, terminals are moved between digital subscriber lines, without requiring a service order, simply by repeating the initialization process at the new location. New terminals with services defined by existing service profiles are added, without requiring a service order, simply by the terminal invoking initialization and sending the identifier for the existing profile. The switching system thereafter includes an identifier for a service profile within messages broadcast on the digital subscriber line. By including the identifier for a service profile within a broadcast message, the switching system selectively addresses terminals based on services enabled for the terminals while still fulfilling the requirement of broadcasting the message to all terminals.

An initialization method in accordance with the invention is used for a switch that is connectable to multiple terminals via a single line. The switch stores a number of service profiles each defining a set of call services. In accordance with the method, the switch receives on the line a first identifier defining one of the terminals and a second identifier defining one of the service profiles. The switch responds to receipt of the first and second identifiers by enabling for the defined terminal the set of call services of the defined service profile.

In an illustrative method of the invention, the switch also responds to receipt of the second identifier by determining third and fourth identifiers for use by the switch in addressing the terminal. The third identifier distinguishes the defined service profile from any other service profiles defining sets of call services enabled for only the multiple terminals on the single line. The fourth identifier distinguishes the defined terminal from any other terminals on the single line for which the set of call services of the defined service profile is enabled.

The switch transmits the third and fourth identifiers to the terminal and thereafter addresses the terminal using the third and fourth identifiers.

Two embodiments of the invention are disclosed herein, one applicable to narrowband ISDN, and one applicable to broadband ISDN (BISDN). In the narrowband embodiment, the first identifier is a terminal endpoint identifier (TEI), the second identifier is a service profile identifier (SPID), the third identifier is a user service identifier (USID), and the fourth identifier is a terminal identifier (TID).

In the broadband embodiment, the first identifier is a reference number, the second identifier is a SPID, the third identifier is a Broadcast Virtual Channel Identifier (B-VCI), and the fourth identifier is a TID.

In the broadband embodiment, each terminal is assigned a unique Virtual Channel for point-to-point signaling procedures. Each terminal is also assigned a Virtual Channel on which it receives broadcast messages. This second Virtual Channel is shared by all terminals on the same BISDN user network interface (UNI) that have the same service profile. This allows the switch to direct a single message (e.g. a SETUP message) to all terminals on a single BISDN UNI with the same service profile. The number of signaling messages that a terminal needs to process is reduced since it will ignore any signaling messages on Virtual Channels not assigned to it, i.e., a terminal will only process the signaling messages sent on the Virtual Channel assigned to it for point-to-point signaling or on the Virtual Channel assigned to it for receiving broadcast signaling messages for its service profile. Advantageously, message processing for terminals on the BISDN UNI is reduced.

In the narrowband embodiment, each terminal stores a service profile identifier defining one of the service profiles. To effect an initialization, a given terminal generates a random number and includes the generated random number in a first message transmitted to the switch. The switch responds to the first message by determining a terminal endpoint identifier that is not assigned to any of the multiple terminals on the line. The switch assigns the determined terminal endpoint identifier to the given terminal. The switch then broadcasts a second message on the line including the random number received in the first message and the assigned terminal endpoint identifier. The given terminal responds to the second message by determining whether the random number received in the second message is the same as the random number it transmitted in the first message. Upon determining that the received random number is the same as the random number it transmitted, the given terminal stores the assigned terminal endpoint identifier and transmits a third message to the switch including the stored terminal endpoint identifier and the service profile identifier stored by the terminal. The switch responds to the third message by determining the service profile defined by the service profile identifier included in the third message. The switch then enables a set of call services for the given terminal that is defined by the determined service profile.

In the broadband embodiment, each terminal stores a service profile identifier defining one of the service profiles. To effect an initialization, a given terminal generates a random number, which is used as a Reference Number. The terminal includes the Reference Number and the service profile identifier (SPID) in the first message transmitted to the switch. The switch responds to the first message by determining a Virtual Channel, identified by a Virtual Path Identifier (VPI) and Virtual Channel Identifier (VCI) pair (referred to herein as a point-to-point virtual channel identifier), that is not assigned to any of the multiple terminals on the line. The switch assigns the determined Virtual Channel to the given terminal. The switch then determines the service profile defined by the service profile identifier included in the first message. The switch enables a set of call services for the given terminal that is defined by the determined service profile and determines a second Virtual Channel to be used for broadcast messages for the service profile defined by the service profile identifier. Unless previously assigned, this second Virtual Channel is assigned to the service profile for broadcasting signaling messages.

The switch then broadcasts a second message on the line including the Reference Number received in the first message, the identifier of the second Virtual Channel (referred to herein as the broadcast virtual channel identifier) to be used by the terminal for receiving signaling messages that the switch is broadcasting for the terminal's service profile, the terminal identifier (TID) to be used to uniquely define the terminal within the service profile, and the identifier of the Virtual Channel to be used by the terminal for point-to-point signaling with the switch. The given terminal responds to the second message by determining whether the Reference Number received in the second message is the same as the Reference Number transmitted in the first message. Upon determining that the received Reference Number is the same as the transmitted Reference Number, the given terminal stores the assigned parameters and sends a message acknowledging receipt of the parameters.

BRIEF DESCRIPTION OF THE DRAWING

FIG. 3 is a memory map for facilities in a terminal of FIG. 1;

FIG. 4 is a message sequence diagram for the initialization of a terminal in FIG. 1 where the initialization is initiated by the terminal;

FIG. 5 is a message sequence diagram for the initialization of a terminal in FIG. 1 where the initialization is initiated by the switch;

FIG. 12 is a memory map for memory facilities in a terminal of FIG. 10;

FIG. 13 is a message sequence diagram for the initialization of a terminal in FIG. 10 where the initialization is initiated by the terminal;

FIG. 14 is a message sequence diagram for the initialization of a terminal in FIG. 10 where the initialization is initiated by the switch;

DETAILED DESCRIPTION

Narrowband ISDN Embodiment

Figure 1:
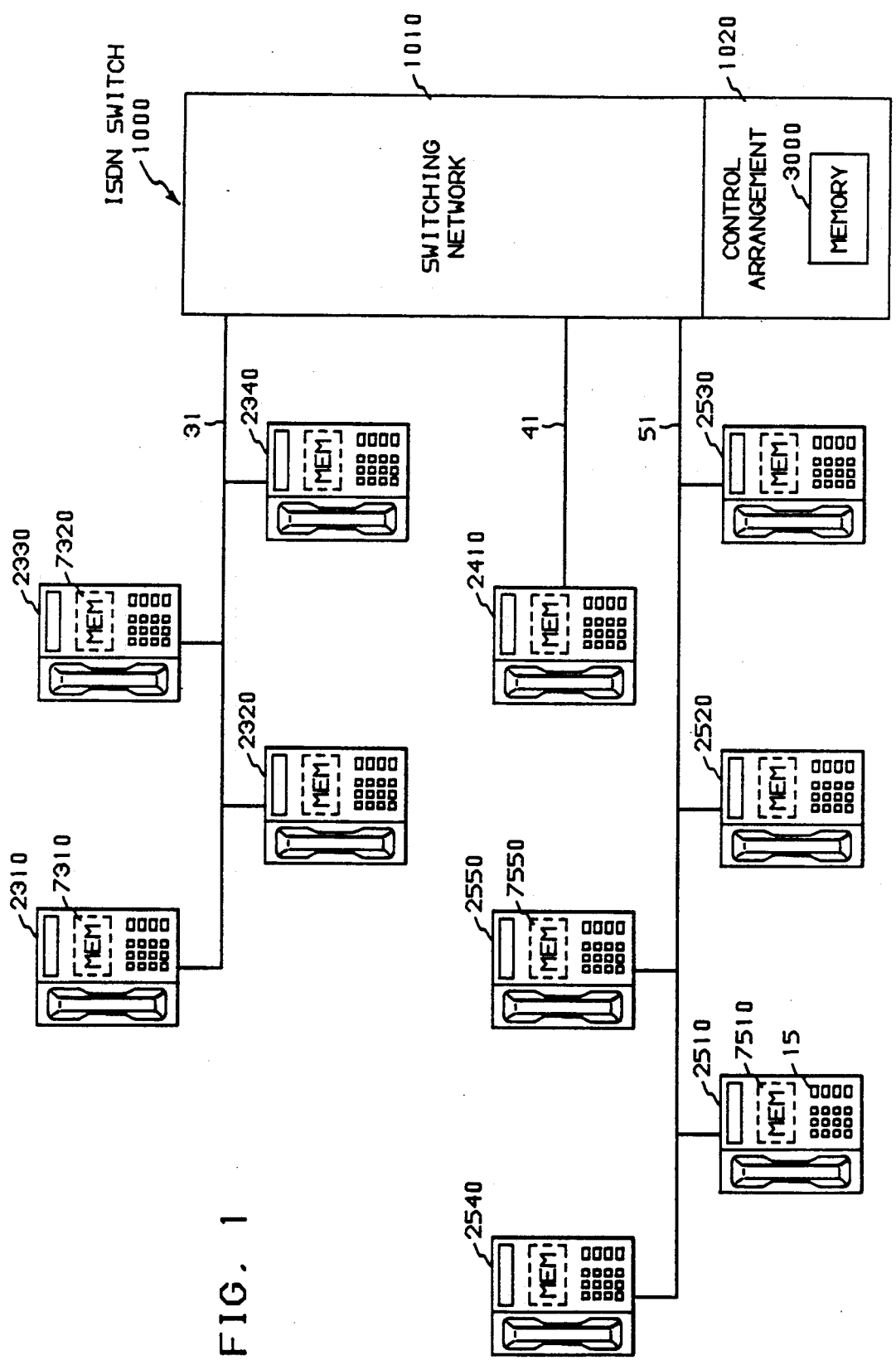
FIG. 1 is a diagram of a narrowband ISDN switch serving a plurality of ISDN terminals.
Figure 2:
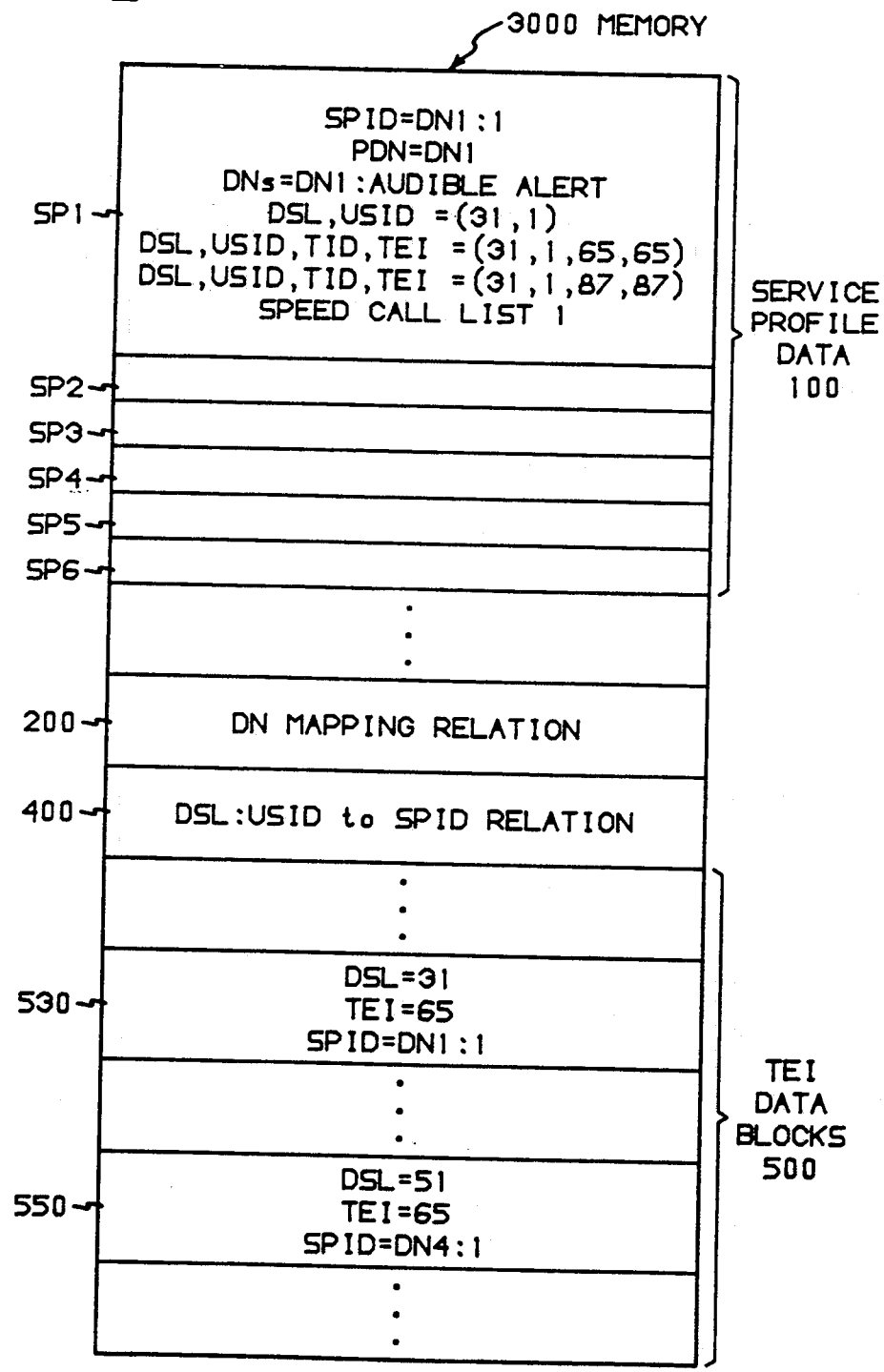
FIG. 2 is a memory map for memory facilities in a control portion of the switch of FIG. 1.
Figure 6:
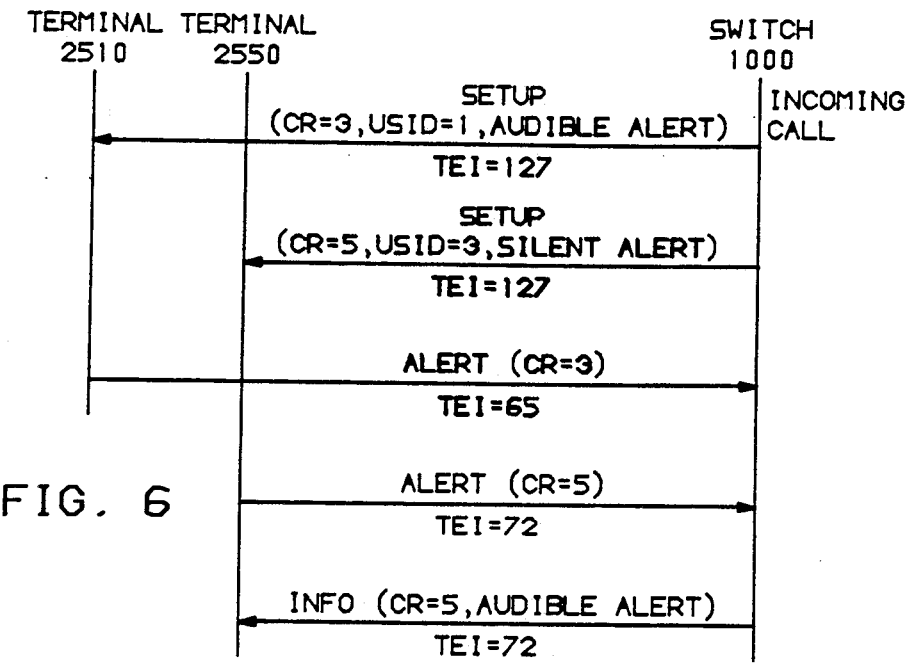
FIG. 6 and FIG. 7 are message sequence diagrams for two call setup examples illustrating the use of addressing parameters established during initialization of a terminal of FIG. 1.
Figure 7:
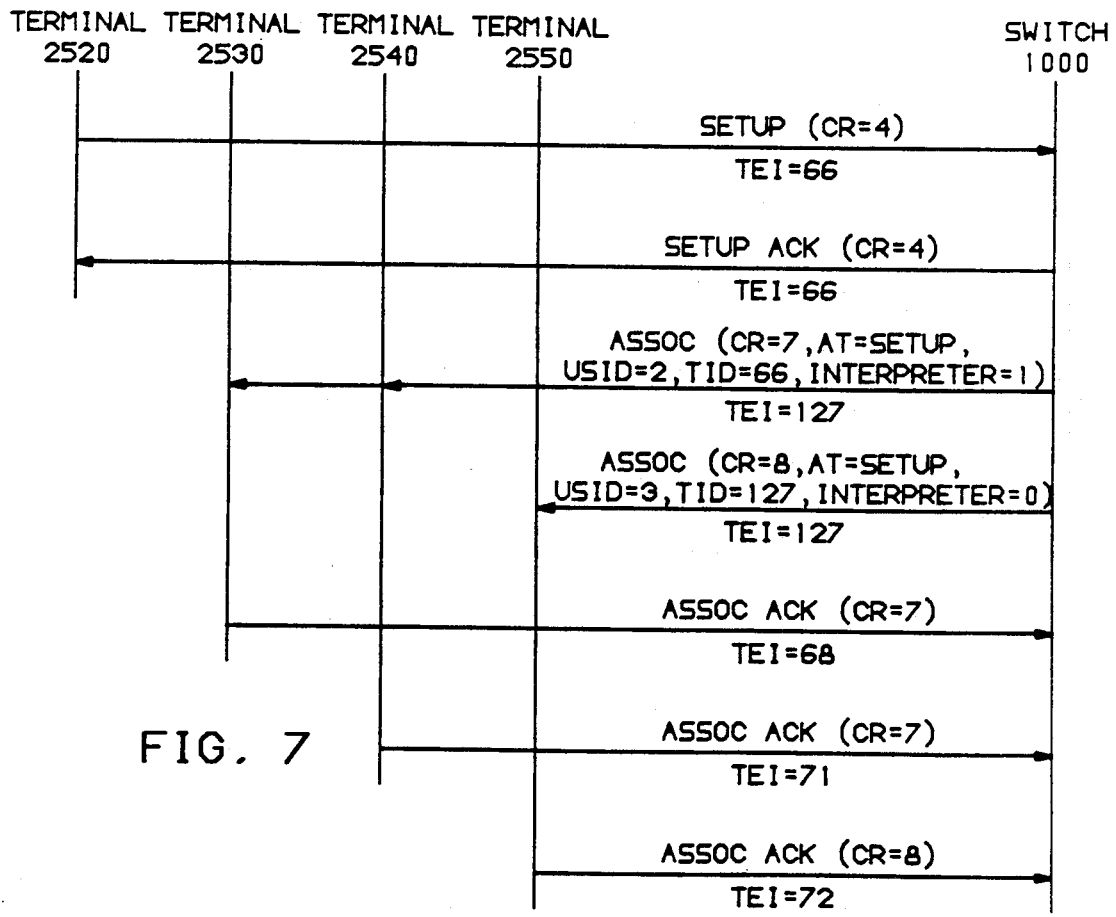
Figure 8:
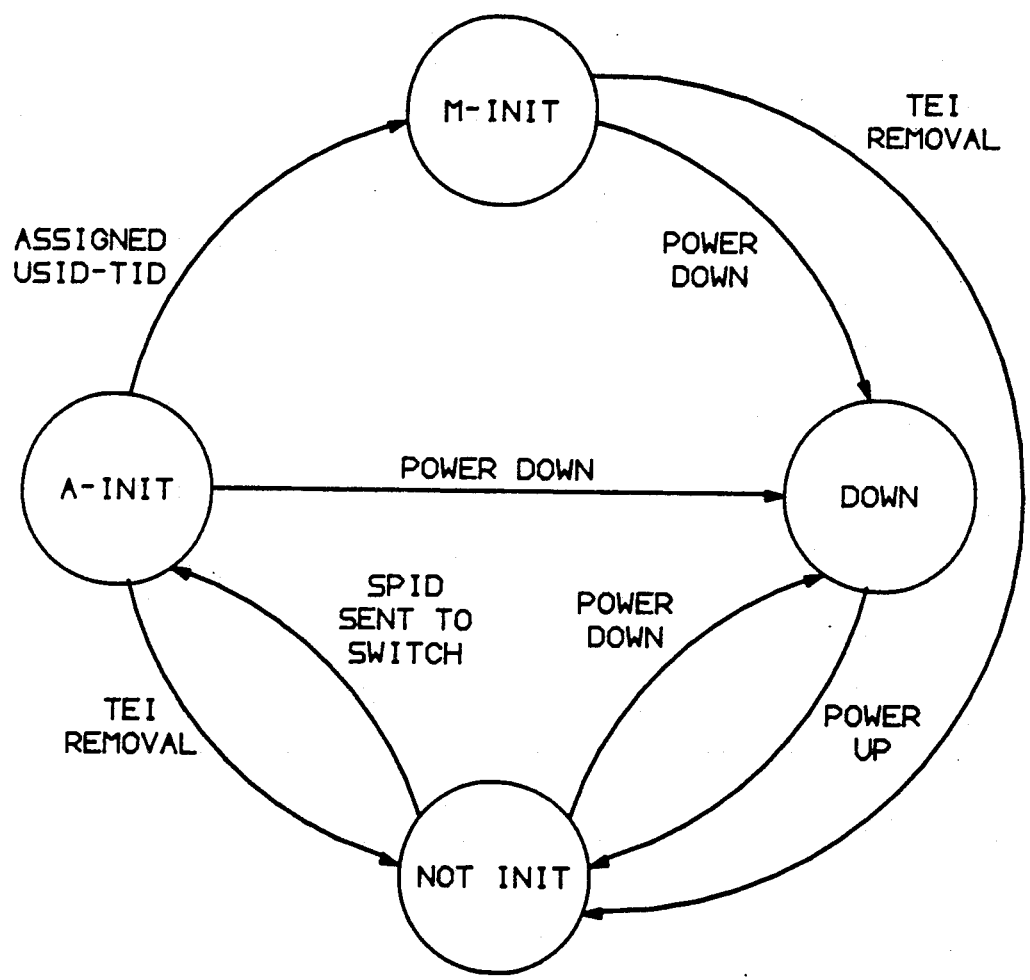
FIG. 8 is a state diagram for a terminal of FIG. 1.
Figure 9:
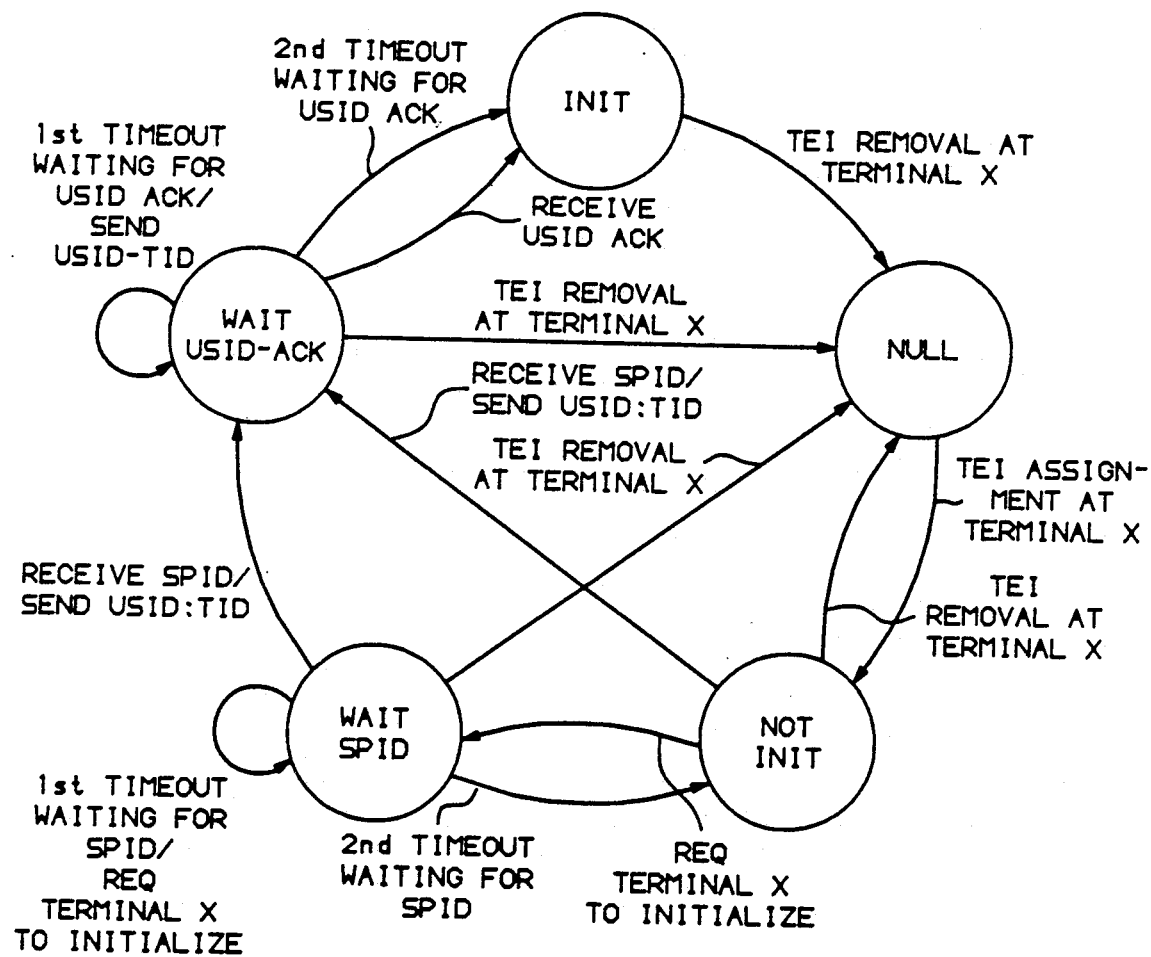
FIG. 9 is a state diagram for the switch of FIG. 1.
Figure 10:
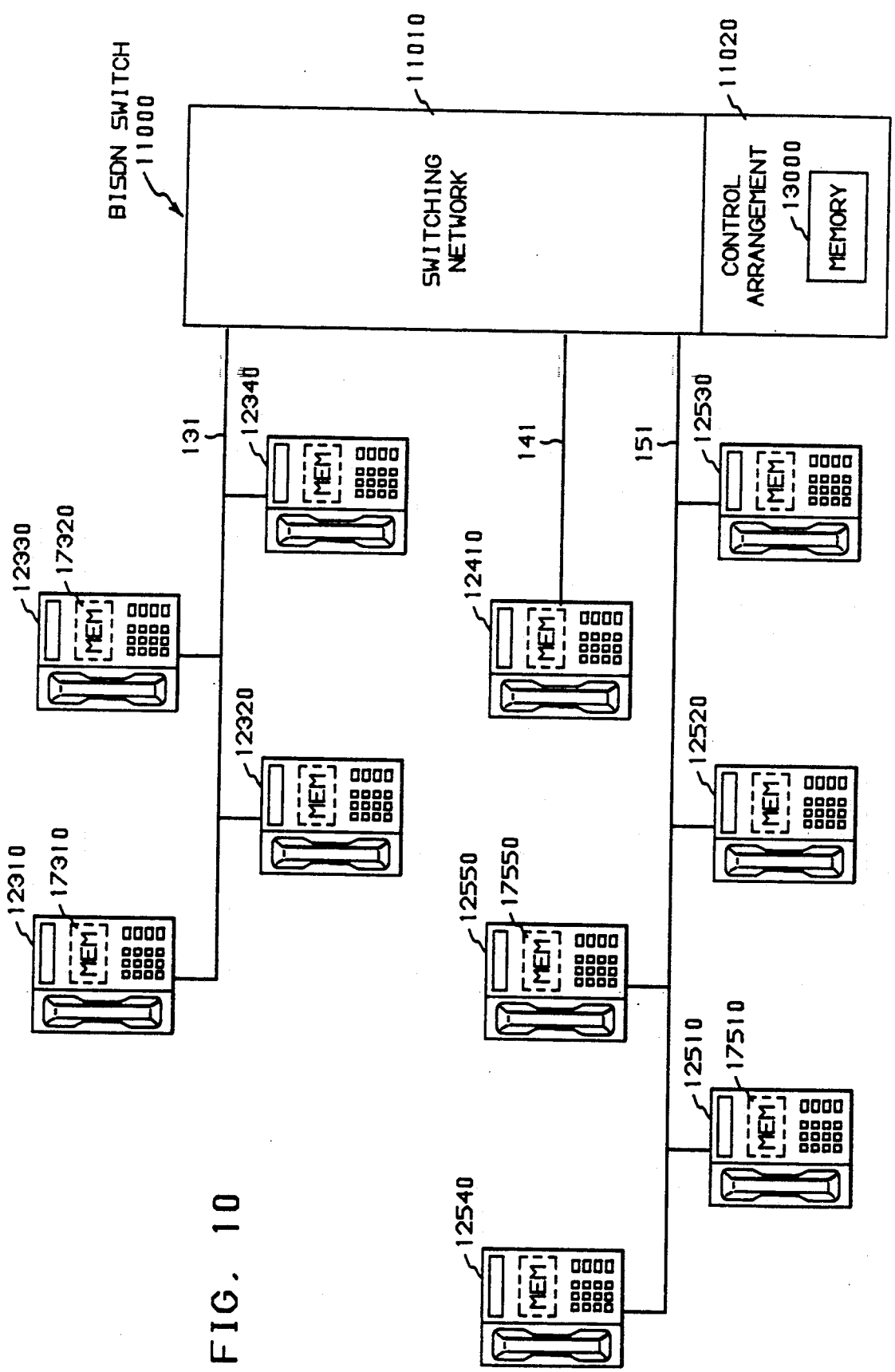
FIG. 10 is a diagram of a broadband ISDN switch serving a plurality of broadband ISDN terminals.

The principles of the present invention are described in the context of an integrated services digital network (ISDN) switch 1000 (FIG. 10). An integrated services digital network is a network evolved from the telephony integrated digital network that provides end-to-end digital connectivity to support a wide range of services, including voice and non-voice services, to which users have access by a limited set of standard customer interfaces. One example of ISDN switch 1000 is the integrated packet switching and circuit switching system disclosed in U.S. Pat. No. 4,592,048 Beckner et al. Switch 1000 includes a switching network 1010, which represents, in the above-referenced exemplary integrated packet switching and circuit switching system, a plurality of time-slot interchange units and a time-multiplexed switch to provide circuit-switched connections, and a plurality of packet switching units (interconnected via the time-slot interchange units and time-multiplexed switch) to provide packet-switched connections. Switch 1000 further includes control arrangement 1020 that represents the control portion of the above-referenced exemplary switching system, including a central control and a plurality of control units that communicate via predetermined channels of the time-multiplexed switch and a control distribution unit.

Each of three digital subscriber lines 31, 41, and 51 connected to switch 1000 provides 144 kb/s of user accessible bandwidth: 64 kb/s for each of two B channels and 16 kb/s for a D channel. While all terminals connected to each digital subscriber line receive a 144 kb/s bandwidth, each terminal does not always require the entire bandwidth. To increase bandwidth usage and decrease outside-plant wiring costs, the CCITT Recommendation I.430 allows connection of multiple terminals to a single digital subscriber line in a point-to-multipoint configuration, using for example a passive bus arrangement.

The process used by switch 1000 to relate each terminal in a point-to-multipoint configuration with subscribed service information stored in memory 3000 of switch 1000 is defined below. First, an example is presented to illustrate how switch 1000 initializes the relationship between a terminal and subscribed service information. Next, several examples are presented to show how switch 1000 uses addressing parameters assigned during the initialization procedure to address individual terminals as well as related groups of terminals. Uses for this addressing method in call processing are also shown. Finally, a more detailed definition of the initialization procedure is given.

The following example illustrates the initialization procedure. In this example, user A has three terminals 2310, 2320, and 2330. All of user A's terminals 2310, 2320, and 2330 are connected to switch 1000 via digital subscriber line 31. User B has two terminals 2340 and 2410. Terminal 2340 is connected to switch 1000 via digital subscriber line 31 and terminal 2410 is connected to switch 1000 via digital subscriber line 41.

CCITT Recommendation I.441/Q.921 defines the link layer (layer 2) protocol implemented by switch 1000. The layer 2 protocol defines an address parameter, the terminal endpoint identifier (TEI), to identify each terminal on a given digital subscriber line. Each terminal 2310, 2320, 2330, 2340, and 2410 includes a memory to store the terminal endpoint identifier and other addressing parameters assigned to the terminal. For example, terminal 2310 includes memory 7310. A single physical device using multiple terminal endpoint identifiers for signaling is treated as multiple terminals. A terminal endpoint identifier, which can assume values from 0 to 127, is included in the address field of all layer 2 frames. Switch 1000 uses a terminal endpoint identifier with a value of 127, referred to as the global terminal endpoint identifier, to broadcast a single message to all terminals on a given digital subscriber line. When switch 1000 transmits a message using the terminal endpoint identifier for a specific terminal, this is referred to as transmitting on a point-to-point link. When switch 1000 transmits a message using the terminal endpoint identifier of 127, this is referred to as transmitting a message on the broadcast link or simply as broadcasting.

Figure 11:
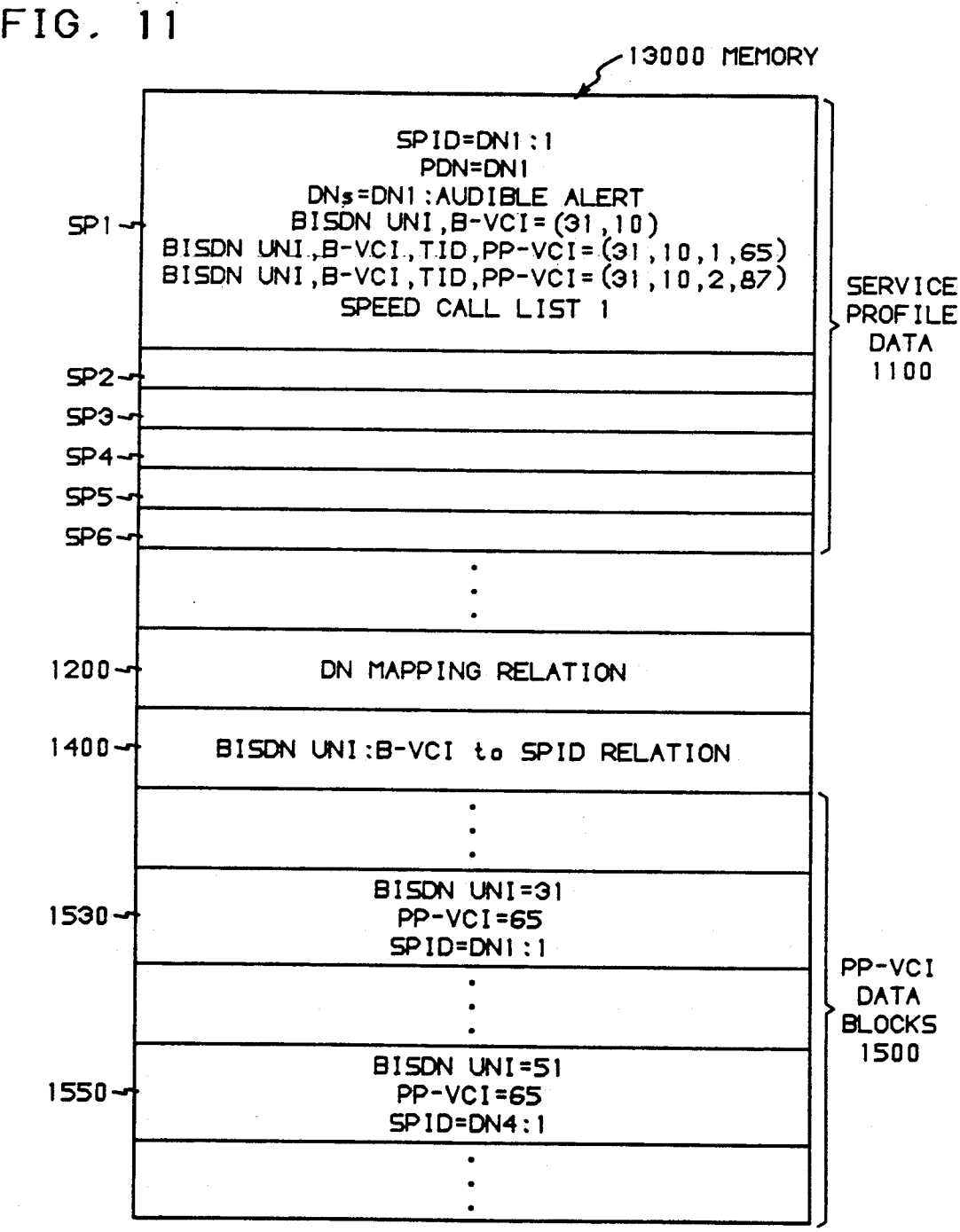
FIG. 11 is a memory map for memory facilities in a control portion of the switch of FIG. 10.

A terminal endpoint identifier is either assigned automatically by switch 1000 or fixed, that is entered into a terminal by a user or a manufacturer. Terminals 2310, 2320, 2330, 2340, and 2410 have automatically-assigned terminal endpoint identifiers. To request assignment of a terminal endpoint identifier, terminal 2310 generates a random number and includes the random number in a message that terminal 2310 transmits to switch 1000 on the broadcast link for digital subscriber line 31. This message and other messages referred to herein are transmitted on the D-Channel. When switch 1000 receives the message including the random number, switch 1000 reads a block 500 (FIG. 11) of memory 3000 to determine a terminal endpoint identifier that is not assigned to any of the other terminals 2320, 2330, and 2340 on digital subscriber line 31. Block 500 includes linked lists of terminal endpoint identifier data blocks for each digital subscriber line. Switch 1000 searches the data blocks in block 500 to determine an unassigned terminal endpoint identifier for digital subscriber line 31. There is no predetermined relationship between the terminal and the terminal endpoint identifier assigned by the switch so switch 1000 chooses any identifier that is unassigned. Switch 1000 determines, for example, that the value of 65 is unassigned. In block 500, switch 1000 creates a data block 530 corresponding to the terminal endpoint identifier of 65 on digital subscriber line 31. Switch 1000 transmits a message, containing the determined terminal endpoint identifier value of 65, on digital subscriber line 31 using the broadcast terminal endpoint identifier, 127. In this message, switch 1000 includes the random number received in the message from terminal 2310. On receipt of the message from switch 1000, terminal 2310 first compares the random number in the received message with the random number that terminal 2310 inserted in the request message. In the present example, the random numbers are the same, indicating that the message is not a coincidental response to a request from another terminal on digital subscriber line 31. Terminal 2310 stores the assigned terminal endpoint identifier value of 65 in a block 900 of memory 7310.

This terminal endpoint identifier assignment exists only as long as the layer 2 link between terminal 2310 and switch 1000 remains established. For example, an automatically-assigned terminal endpoint identifier is removed when a terminal is disconnected. When terminal endpoint identifier removal occurs, terminal 2310 must repeat the above assignment procedure when it requires a terminal endpoint identifier. The terminal endpoint identifier assigned when the procedure is repeated is not necessarily the terminal endpoint identifier that was previously assigned.

Service profiles stored in a block 100 (FIG. 11) of memory 3000 describe the directory numbers and services to which a user has subscribed. Service profile SP1 (FIG. 11) defines the directory numbers and the services subscribed to by user A for terminals 2310 and 2320. Service profile SP2 defines services subscribed to by user A for terminal 2330. Service profile SP3 defines services subscribed to by user B for terminals 2340 and 2410. Service profiles may contain but are not limited to containing the following information: (1) Primary directory number (described later herein); (2) List of all directory numbers used to call terminals that are defined by the service profile; (3) For each directory number defined in the profile, any special actions to be taken for calls to that directory number (e.g. service profile SP1 specifies audible alerting for DN1); (4) List of digital subscriber lines on switch 1000 and USID values (described later herein); (5) List of services and related data (e.g. speed calling and speed call list); (6) Data specifying the function of terminal feature buttons.

In the present example, user A subscribes to conflicting features. User A therefore requires multiple service profiles. User A requires one speed call list for terminals 2310 and 2320 and a different speed call list for terminal 2330. Further, user A requires terminal 2330 to silently alert for calls to DN1 while terminals 2310 and 2320 audibly alert for calls to DN1. Thus, two service profiles are required, one profile for terminals 2310 and 2320 and another profile for terminal 2330.

Service profiles SP1, SP2, and SP3 are initially entered into block 100 of memory 3000 through service order requests when user A and user B establish ISDN service. Later changes to the service profiles, such as the addition of services, are made by service order requests and the data stored in block 100 of memory 3000 are updated. In addition, some data in the service profiles are updated by the initialization procedure discussed below.

The initialization procedure for relating a given terminal with a service profile stored in block 100 of memory 3000 is illustrated using terminal 2310. During the following initialization procedure, switch 1000 stores data in memory 3000 relating terminal 2310 on digital subscriber line 31 to service profile SP1 and assigns layer 3 address parameters to terminal 2310. The relationship created between terminal 2310 and service profile SP1, however, is only transitory. The initialization procedure is repeated when terminal 2310 undergoes terminal endpoint identifier removal or when other events described herein occur.

The service profile identifier (SPID), a terminal resident parameter, identifies the service profile describing the services subscribed for a terminal. In this exemplary embodiment, the service profile identifier consists of two fields: the primary directory number (PDN) and the primary directory number index. However, other naming conventions may be used for the service profile identifier. Each user has a unique primary directory number and all terminals with the same primary directory number belong to the same user. User A's primary directory number is DN1. User B's primary directory number is DN2. Although a single terminal may have several directory numbers, every terminal has a directory number that is considered its primary directory number. The primary directory number index is used in combination with the primary directory number to identify a particular service profile when a user has multiple service profiles. This naming convention uniquely identifies a service profile over the entire switching system. Following this naming convention, the service profile identifier for user A's terminals 2310 and 2320 is (DN1:1). The service profile identifier for user A's terminal 2330 is (DN1:2). The service profile identifier for user B's terminals 2340 and 2410 is (DN2:1).

A network administrator provides service profile identifiers to a user when the user subscribes to the ISDN service. The service profile identifier for terminal 2310 is stored in a non-volatile memory block 600 (FIG. 12) of memory 7310 to retain the service profile identifier even if terminal 2310 loses power. User A initializes or changes the service profile identifier by interacting with terminal 2310 in a local mode and entering the desired value into block 600. User A initializes the value of the service profile identifier stored in block 600 of memory 7310 to the primary directory number and primary directory number index for terminal 2310, (DN1:1).

Either the switch or the terminal may invoke initialization. FIG. 13 shows the messages exchanged when the terminal invokes initialization while FIG. 14 shows the messages exchanged when the switch invokes initialization. Terminal 2310 invokes initialization by transmitting an initialization request containing its service profile identifier to switch 1000. Switch 1000 invokes initialization by transmitting a message to terminal 2310 requesting terminal 2310 to transmit its service profile identifier to switch 1000. This additional message is the only difference between switch invoked and terminal invoked procedures. When terminal 2310 receives a message from switch 1000 requesting that it transmit its SPID, terminal 2310 responds with the same message that it transmits to invoke initialization.

In the present example, terminal 2310 invokes initialization by transmitting a message to switch 1000 containing its service profile identifier, (DN1). In response to the message transmitted by terminal 2310, switch 1000 searches block 100 of memory 3000 for a service profile identified by (DN1). The search is successful and shows that service profile identifier (DN1) identifies service profile SP1.

Next, switch 1000 assigns a user service identifier (USID) and a terminal identifier (TID) to terminal 2310. A USID, which in this exemplary embodiment ranges in value from 0 to 255, is an addressing parameter used by switch 1000 in layer 3 messages. The global USID, 255, is used to address all terminals on a given digital subscriber line. A USID, a short version of the service profile identifier, uniquely identifies a service profile on a given digital subscriber line and is used to address all terminals with the same service profile. The USID has significance only on a given digital subscriber line while the service profile identifier has significance over the entire switch 1000. Although the USID is used as a layer 3 addressing parameter in this exemplary embodiment, the service profile identifier could be used as a layer 3 addressing parameter. However, using the USID reduces the size of messages transmitted between switch 1000 and terminal 2310. The TID, which in this exemplary embodiment ranges in value from 0 to 127, when combined with a USID identifies a specific terminal on a given digital subscriber line. The TID value of 127, referred to as the global TID, is used as a wild card value. A USID and TID parameter with the TID set to 127 addresses all terminals with the value specified in the USID.

To assign a USID to terminal 2310, switch 1000 first reads data stored in service profile SP1 to determine if a USID has been assigned on digital subscriber line 31 for service profile SP1. Service profile SP1 contains a relation defining digital subscriber line and USID pairs allocated for service profile SP1. The relation is keyed by digital subscriber line and includes one non-key attribute, USID. Switch 1000 reads the relation using a key value of 31 corresponding to digital subscriber line 31, but finds no tuple with that key value. Accordingly, switch 1000 inserts a tuple, (31, 1), into the relation in service profile SP1. This allocates a USID with value of 1 to service profile SP1 on digital subscriber line 31. Switch 1000 also inserts a tuple into a relation in a block 400 (FIG. 11) of memory 3000 that relates a digital subscriber line and USID to a service profile identifier. This relation is keyed by a compound key formed from digital subscriber line and USID and contains one non-key attribute, service profile identifier. Switch 1000 inserts the tuple (31, 1, DN1:1).

Switch 1000 assigns the terminal endpoint identifier for terminal 2310 as the value of the TID for terminal 2310. Switch 1000 obtains the terminal endpoint identifier from level 2 frames of the message sent from terminal 2310 to switch 1000. Other methods can be used to derive a unique TID and there is no requirement that the terminal endpoint identifier and the TID be the same. Assigning the TID the value of the terminal endpoint identifier is simple to implement and guarantees a unique value since all terminals on a digital subscriber line have unique terminal endpoint identifiers. The terminal endpoint identifier value for terminal 2310 is 65. Service profile SP1 contains a relation relating each (USID:TID) pair for a given digital subscriber line to a terminal endpoint identifier. Switch 1000 inserts a tuple into this relation relating (1:65) on digital subscriber line 31 to a terminal endpoint identifier with value 65.

Next, switch 1000 stores the received service profile identifier, (DN1:1), in the data block 530 of memory 3000. This establishes a relationship between terminal 2310, identified by a digital subscriber line and terminal endpoint identifier pair, (31:65), and the service profile SP1, identified by the service profile identifier (DN1:1).

Switch 1000 transmits the assigned (USID:TID) pair, (1:65), to terminal 2310 in a message on the point-to-point signaling link identified by the terminal endpoint identifier with value of 65. On receipt of this message, terminal 2310 stores the USID and TID in block 700 and block 800 (FIG. 12) respectively of memory 7310. Terminal 2310 transmits a message to switch 1000 acknowledging receipt of the (USID:TID) pair.

A similar procedure is followed for initialization of user A's other terminals 2320 and 2330 as well as user B's terminals 2340 and 2410. Table 1 presents the parameters that exist after the above initialization procedure is completed for terminals 2310, 2320, 2330, 2340, and 2410.

TABLE 1

| USER TERMINAL | USER "A" 2310 | USER "A" 2320 | USER "A" 2330 | USER "B" 2340 | USER "B" 2410 |
|---|---|---|---|---|---|
| (DSL:TEI) | (31:65) | (31:87) | (31:76) | (31:68) | (41:65) |
| (DSL:USID:TID) | (31:1:65) | (31:1:87) | (31:7:76) | (31:2:68) | (41:7:65) |
| SPID | (DN1:1) | (DN1:1) | (DN1:4) | (DN2:0) | (DN2:0) |

This example illustrates the association of more than one terminal with a single service profile and the location of terminals associated with the same service profile on the same digital subscriber line or on separate digital subscriber lines. Since the relationship between a particular terminal and a given service profile is not statically assigned at subscription time but is instead dynamically established by the above initialization procedure, a user may add terminals or move terminals between digital subscriber lines at the user's convenience.

The service profile information for this two user example is found in Table 2.

TABLE 2

| SERVICE PROFILE | SP1 | SP2 | SP3 |
|---|---|---|---|
| SPID | DN1:1 | DN1:4 | DN2:0 |
| PDN | DN1 | DN1 | DN2 |
| DNs | DN1-Aud. Alert | DN1-Silent Alert for 20 sec. | DN2-Aud. Alert |
| (DSL:USID) | (31:1) | (31:7) | (31:2) |
|  |  |  | (41:7) |
| (DSL:USID:TID:TEI) | (31:1:65:65) | (31:7:76:76) | (31:2:68:68) |
|  | (31:1:87:87) |  | (41:7:65:65) |
| SERVICES | Speed Call List 1 | Speed Call List 2 |  |

Switch 1000 uses the USID and TID parameters assigned to terminals 2310, 2320, 2330, 2340, and 2410 to address individual terminals or groups of related terminals on digital subscriber lines 31, 41, and 51. To transmit a message to terminal 2310 on digital subscriber line 31, switch 1000 addresses the message with a (USID:TID) pair of (1:65). The (USID:TID) pair (1:65) uniquely identifies terminal 2310 on digital subscriber line 31. Assume that switch 1000 transmits this message on digital subscriber line 31 using the broadcast terminal endpoint identifier, 127. Each of the terminals 2310, 2320, 2330, and 2340 will compare the USID and TID in the message with the USID and TID values stored in their memory. Terminal 2320 compares the USID and TID stored in memory 7320 with the USID and TID specified in the message. The USID matches but the TID does not match so terminal 2320 discards the message. Terminals 2330 and 2340 compare the USID and TID specified in the message with the USID and TID stored in their respective memories. The USID values do not match, so both terminals 2330 and 2340 discard the message. Terminal 2310, on the other hand, compares the USID in the message with the USID stored in block 700 of memory 7310 and determines that the values match. Terminal 2310 compares the TID in the message with the TID stored in block 800 of memory 7310 and determines that the values match. Thus, terminal 2310 processes the message.

To transmit a message to all terminals sharing a specific service profile on the given digital subscriber line, switch 1000 addresses the message with the USID identifying the specific service profile on digital subscriber line 31 and the global TID. Consider an example of switch 1000 sending a message to all terminals for service profile SP1 on digital subscriber line 31. Service profile SP1 is identified on digital subscriber line 31 by a USID value of 1. Switch 1000 addresses the message with a (USID:TID) parameter of (1:127), corresponding to the specific USID and the global TID. Switch 1000 broadcasts this message on digital subscriber line 31 using the broadcast terminal endpoint identifier, 127. When terminals 2330 and 2340 receive the message, they examine the (USID:TID) address parameter and determine that the USID specified is not the USID stored in their respective memories. Thus, terminals 2330 and 2340 discard the message. Terminal 2310 and 2320, however, both recognize the global TID and determine that the USID matches the USID stored in their respective memories. Since the message contains the global TID, terminal 2310 and 2320 do not perform any comparison on the TID. Both terminal 2310 and terminal 2320 process the message.

The USID and TID addressing scheme also allows switch 1000 to address all but one specific terminal associated with a given service profile. An octet is allocated in messages for the TID and an interpreter bit. The 7 low order bits in the octet are used to represent the TID, which ranges in value from 0 to 127, and the high order bit of the octet is used as the interpreter bit. When the interpreter bit is set to 0, as has been assumed in all the previous examples and all other examples unless specifically stated, the terminals interpret the USID and TID address as illustrated by the examples above. When the interpreter bit is set to 1, terminals interpret the address as specifying all terminals with the indicated USID except the terminal specified by the TID. Consider the following example of transmitting a message to all terminals for service profile SP1 on digital subscriber line 31 except terminal 2320. Service profile SP1 is identified on digital subscriber line 31 by a USID value of 1. In preparing the message, switch 1000 sets the USID in the message to 1, sets the interpreter bit to 1, and sets the remaining 7 bits in the octet specifying the TID to the TID value of 87 corresponding to terminal 2320. Switch 1000 transmits the message on digital subscriber line 31 using the broadcast terminal endpoint identifier, 127. Since, as discussed in the above examples, the USID in the message does not match the USID for terminals 2330 and 2340, these terminals discard the message. Terminal 2320 compares the USID and TID specified in the message with the USID and TID stored in memory 7320. The USID and TID specified in the message match the corresponding values in memory 7320. Since the interpreter bit is set to 1 and the TID matches, the terminal recognizes that the message is not addressed to it and discards the message. Terminal 2310 compares the USID and TID specified in the message with the USID and TID stored in memory 7310. The USID matches but the TID does not match. Since the interpreter bit is set to 1, terminal 2310 processes the message.

The following examples illustrate the use of the USID and TID by switch 1000 in call processing. In these examples, user C, identified by primary directory number DN4, has one terminal 2510. User D, identified by primary directory number DN5, has three terminals 2520, 2530, and 2540. User E, identified by primary directory number DN6, has one terminal 2550. Each of the five terminals is located on digital subscriber line 51.

Assume that terminals 2510, 2520, 2530, 2540, and 2550 have completed the above initialization procedure and that the address parameters shown in Table 3 have been assigned.

TABLE 3

| USER TERMINAL | USER "C" 2510 | USER "D" 2520 | USER "D" 2530 | USER "D" 2540 | USER "E" 2550 |
|---|---|---|---|---|---|
| (DSL:TEI) | (51:65) | (51:66) | (51:68) | (51:71) | (51:72) |
| (DSL:USID:TID) | (51:1:65) | (51:2:66) | (51:2:68) | (51:2:71) | (51:3:72) |
| SPID = | (DN4:1) | (DN5:1) | (DN5:1) | (DN5:1) | (DN6:1) |

Three service profiles SP4, SP5, and SP6 (FIG. 11) define the services subscribed to by these users. Each of the three service profiles SP4, SP5, and SP6 specify key system service. Key-system service allows each of the users C, D, and E to have multiple DNs and to share these DNs with the other users. For calls to DN4 and DN5, service profile SP6 specifies silent alerting followed in 18 seconds by audible alerting if the call has not been answered. Otherwise, audible alerting is specified in service profiles SP4, SP5, and SP6 for all directory numbers. Table 4 illustrates the service profile information for the following examples.

TABLE 4

| Service Profile | SP 4 | SP 5 | SP 6 |
|---|---|---|---|
| SPID | DN4:1 | DN5:1 | DN6:1 |
| PDN | DN4 | DN5 | DN6 |
| DNs | DN4-Aud. Alert | DN5-Aud. Alert | DN4-Silent Alert for 18 sec. |
|  | DN7-Aud. Alert | DN7-Aud. Alert | DN5-Silent Alert for 18 sec. |
|  |  |  | DN6-Aud. Alert |
|  |  |  | DN7-Aud. Alert |
|  |  |  | DN8-X.25 Packet |
| (DSL:USID) | (51:1) | (51:2) | (51:3) |
| (DSL:USID:TID:TEI) | (51:1:65:65) | (51:2:66:66) | (51:3:72:72) |
|  |  | (51:2:68:68) |  |
|  |  | (51:2:72:72) |  |
| SERVICES Feature | Key System 15 - ACBC | Key System | Key System |

TABLE 4-continued

| Service Profile | SP 4 | SP 5 | SP 6 |
| --- | --- | --- | --- |
| Buttons | | | |

Switch 1000 addresses an individual terminal when providing recall services such as automatic call back calling. For example, assume terminal 2510 invokes auto call back calling. When terminal 2510 invokes the service, switch 1000 saves the USID and the TID of terminal 2510, (1:65). To recall terminal 2510, switch 1000 broadcasts a SETUP message on digital subscriber line 51 addressed with the saved USID and TID, (1:65).

Figure 15:
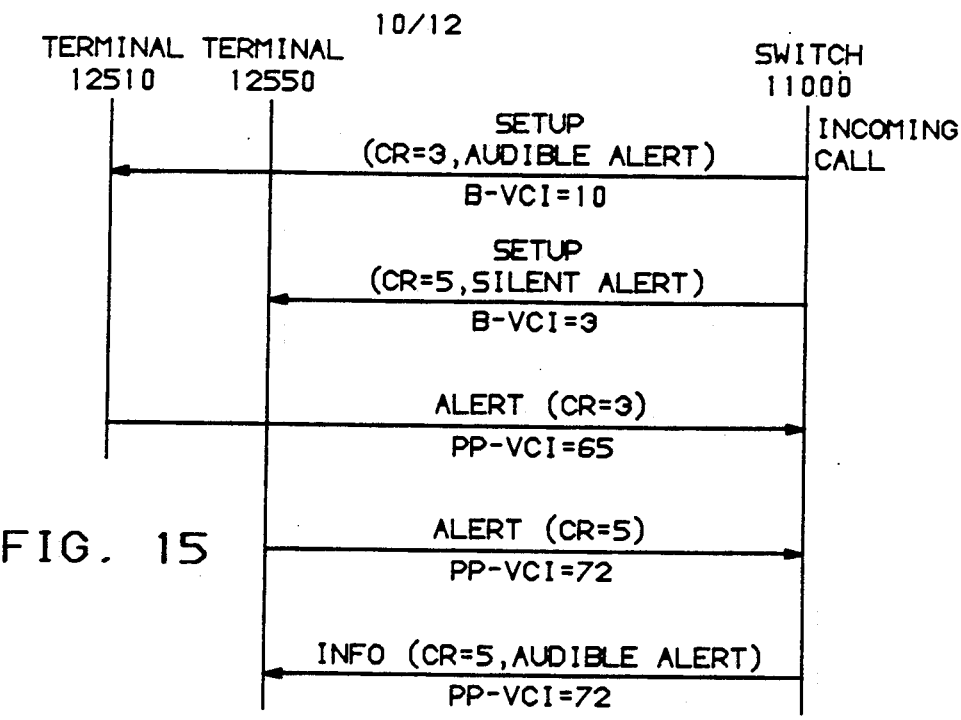
FIG. 15 and FIG. 16 are message sequence diagrams for two call setup examples illustrating the use of addressing parameters established during initialization of a terminal of FIG. 10.

The next example illustrates use of the USID and TID addressing parameters in call offering. FIG. 15 is a diagram of the message flow between switch 1000 and terminals 2510 and 2550 for this example. For an incoming call, switch 1000 uses the directory number mapping relation stored in block 200 of memory 3000 (FIG. 11) to map the called directory number to (DSL:USID) pairs corresponding to each digital subscriber line and service profile combination related to the directory number. Data is inserted in the directory number mapping table through service orders when a user subscribes to a directory number. Table 5 defines the directory number mapping table for the following examples. An asterisk denotes that the service profile in the corresponding column subscribes to the called directory number.

TABLE 5

| DN | SP 4 | SP 5 | SP 6 |
| --- | --- | --- | --- |
| DN4 | * | | * |
| DN5 | | * | * |
| DN6 | | | * |
| DN7 | * | * | * |
| DN8 | | | * |

When an incoming call arrives at switch 1000 for directory number DN4, switch 1000 reads the directory number mapping relation in block 200 of memory 3000 to determine all service profiles, identified by (DSL:USID), that subscribe to directory number DN4. The (DSL:USID) combinations determined are (51:1) and (51:3). Switch 1000 reads the service profiles associated with these (DSL:USID) combinations to determine if the service profiles specify any special terminating treatment for calls to DN4. The service profiles associated with (51:1) and (51:3) are service profile SP4 and service profile SP6, respectively. Service profile SP4 specifies audible alerting for calls to DN4. Service profile SP6 specifies silent alerting for 18 seconds for calls to DN4 followed by audible alerting.

CCITT Recommendation I.441/Q.931 requires that SETUP messages be broadcast using the broadcast terminal endpoint identifier. Switch 1000 offers the call to terminals associated with SP4 by broadcasting a SETUP message addressed with a (USID:TID) address of (1:127) on digital subscriber line 51. The SETUP message contains a call reference value of 3, a signal information element specifying audible alerting and a (USID:TID) pair of (1:127). The call reference value is used by switch 1000 to associate a series of messages.

Switch 1000 offers the call to terminals associated with service profile SP6 also by broadcasting a SETUP message on digital subscriber line 51. This SETUP message contains a call reference value of 5, a signal information element specifying silent alerting, and a (USID:TID) pair of (3:127). Since the call is offered to both service profiles, distinct call reference values are used for each SETUP message so that switch 1000 can separate the resulting series of messages.

On receipt of the message addressed by the (USID:TID) pair of (1:127), terminal 2510 recognizes the global TID in the message and compares the USID specified in the message with the USID stored in memory 7510. The USID matches so terminal 2510 sends an ALERTing message to switch 1000 and begins to audibly alert. Terminal 2550 also recognizes the global TID in the message and compares the USID specified in the message with the USID stored in memory 7550. The USID does not match so terminal 2550 disregards the message.

On receipt of the message addressed by the (USID:TID) pair of (3:127), terminal 2510 recognizes the global TID in the message and compares the USID specified in the message with the USID stored in memory 7510. The USID does not match so terminal 2510 disregards the message. Terminal 2550 recognizes the global TID in the message and compares the USID specified in the message with the USID stored in memory 7550. The USID matches so terminal 2550 sends an ALERTing message to switch 1000 and begins to silently alert.

For both SETUP messages, each of terminals 2520, 2530, and 2540 determine that the USID specified in the message does not match the USID stored in their respective memory and thus these terminals disregard both messages and do not alert.

Finally, if the call is not answered within 18 seconds, switch 1000 sends an INFOrmation message to terminal 2550 containing a call reference value of 5 and a signal information element specifying audible alerting.

Notice in this example that switch 1000 addressed the SETUP messages on a service profile basis and did not send individual messages to each terminal. Thus, switch 1000 offers calls on a service profile basis without requiring data defining how many terminals are associated with a particular service profile. This illustrates the flexibility available to a user in adding or removing terminals without requiring a service order.

The next example defines the procedure used for an incoming X.25 call. Without the initialization procedures, permanent D-channel X.25 services including permanent virtual circuits as specified by CCITT Recommendations X.25 and X.31 could only be supported on subscribed-to fixed terminal endpoint identifiers. Permanent X.25 service requires the switch to deliver the X.25 Incoming Call packet to the proper D-channel packet link, designated by a specific terminal endpoint identifier. Switch 1000 associates the packet links with the appropriate service profile during the initialization procedure. This allows fixed and automatic terminal endpoint identifiers to be used for permanent D-channel packet services.

For example, when there is an incoming X.25 packet call to switch 1000 for destination address DN8, switch 1000 performs a DN mapping that produces the (DSL:USID) pair (51:3). Since the X.25 packet call must be offered on a specific D-channel packet link specified by a terminal endpoint identifier, switch 1000 determines the (DSL:TEI) pair. Switch 1000 reads the relation in block 400 (FIG. 11) of memory 3000 to determine that (DN6:1) identifies the service profile. Using this service profile identifier, switch 1000 searches the service profiles in block 100 (FIG. 11) of memory 3000 with the service profile identifier and retrieves service profile SP6. Switch 1000 reads data in service profile SP6 and determines that the terminal endpoint identifier is 72. Finally, switch 1000 offers an X.25 Call Request Packet on the D-Channel packet link associated with (DSL:TEI)=(1:72).

Figure 16:
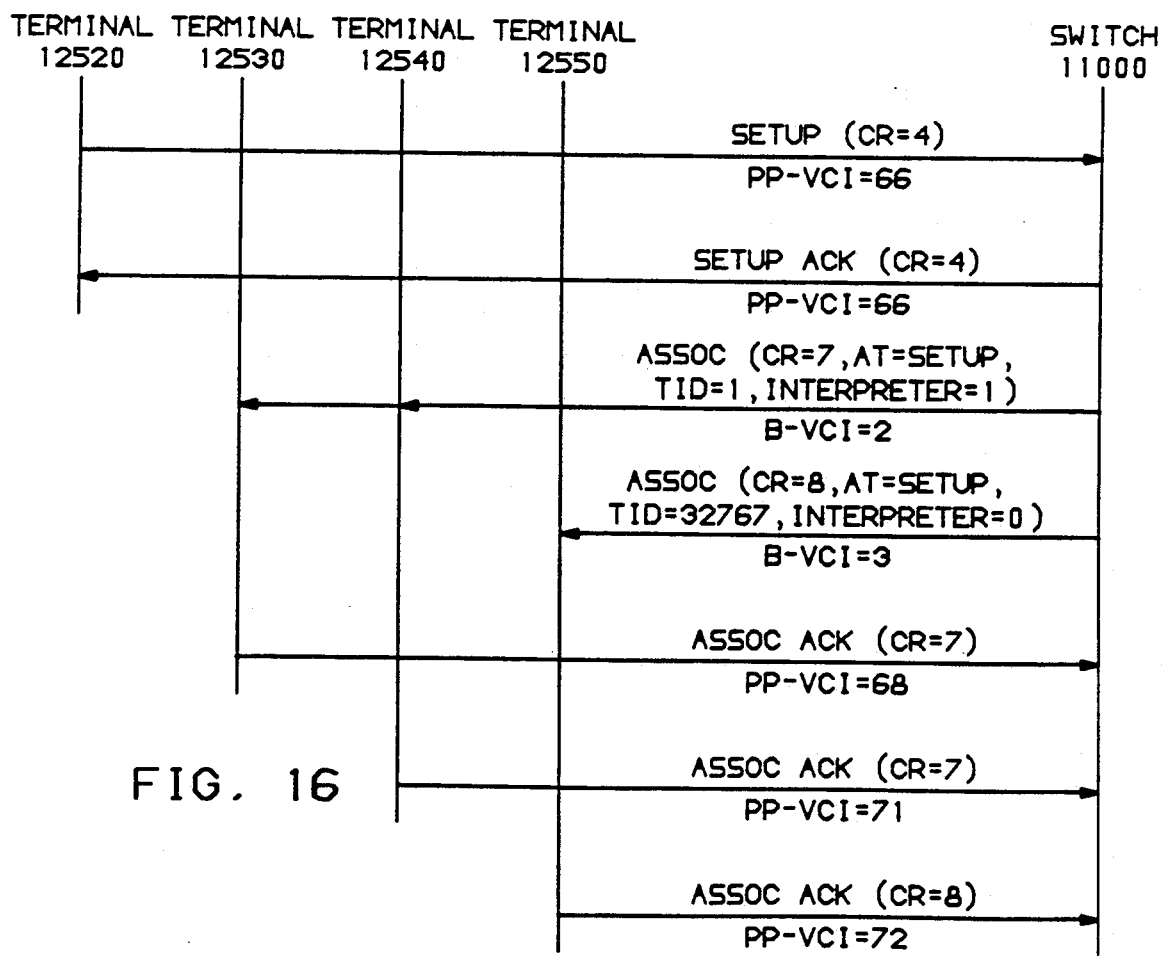

The following example shows switch 1000 using the interpreter bit. FIG. 16 illustrates the message flow for this example. Terminal 2520 sends a SETUP message to switch 1000 to place an outgoing call using DN5. On receipt of this message, switch 1000 sends a SETUP ACK message to terminal 2520 on the point-to-point link identified by the terminal endpoint identifier for terminal 2520. Switch 1000 determines the USID and TID associated with terminal 2520. Next, switch 1000 broadcasts an ASSOC message on digital subscriber line 51 to all terminals that share DN5 to inform the terminals of the call origination. If switch 1000 were to broadcast the message to all terminals sharing service profile SP5, terminal 2520 would receive the message, recognize that the message was addressed to it, and process the message. Terminal 2520 would interpret the message to indicate that it could not originate a call on DN5. To eliminate this ambiguity, switch 1000 uses the interpreter bit to address the ASSOC message to all terminals sharing service profile SP5 except terminal 2520.

Switch 1000 addresses the message using the USID and TID for terminal 2520, (2:66), with the interpreter bit set to 1. Switch 1000 broadcasts this message on digital subscriber line 51. Switch 1000 does not have to send individual ASSOC messages to each terminal but instead broadcast messages on a service profile basis. On receipt of the message, terminal 2530 and 2540 both recognize that the message is addressed to them and repond by sending ASSOC_ACK messages to switch 1000. Switch 1000 also sends an ASSOC message to all terminals sharing service profile SP6 since this profile also includes D5. Switch 1000 addresses this message using the USID for service profile SP6 and the global TID and broadcasts the message on digital subscriber line 51. On receipt of the message, terminal 2550 recognizes that the message is addressed to it and responds by sending an ASSOC_ACK message to switch 1000.

The final example has a terminal transmitting a message to switch 1000 to originate a call or to indicate the activation of some feature at the terminal. Here switch 1000 uses the DSL:TEI to service profile association that was recorded in the terminal endpoint identifier data blocks 500 at initialization to identify the service profile associated with the terminal. For example, assume user C invokes automatic call back calling by activating feature button 15 on terminal 2510. Terminal 2510 sends a message to switch 1000 indicating that feature button 15 was activated. The message from terminal 2510 contains the terminal endpoint identifier, which has a value of 65, for terminal 2510. Switch 1000 reads data block 550 of memory 3000 to determine the service profile associated with the terminal endpoint identifier value of 65 on digital subscriber line 51. The service profile identifier specified is (DN4:1). Switch 1000 searches block 100 in memory 3000 for a service profile identified by the service profile identifier, (DN4:1). The service profile that switch 1000 retrieves is service profile SP4. Data in service profile SP4 defines the service associated with the feature buttons on terminal 2510. Switch 1000 reads this data to determine the services associated with feature button 15. The data define feature button 15 as the button for automatic call back calling. Switch 1000 processes the request accordingly.

The following describes in greater detail the states that terminal 2310 and switch 1000 enter during initialization. First, the states and state transitions for terminal 2310 are discussed. Next, the states and state transitions for switch 1000 relating to terminal 2310 are discussed.

Figure 17:
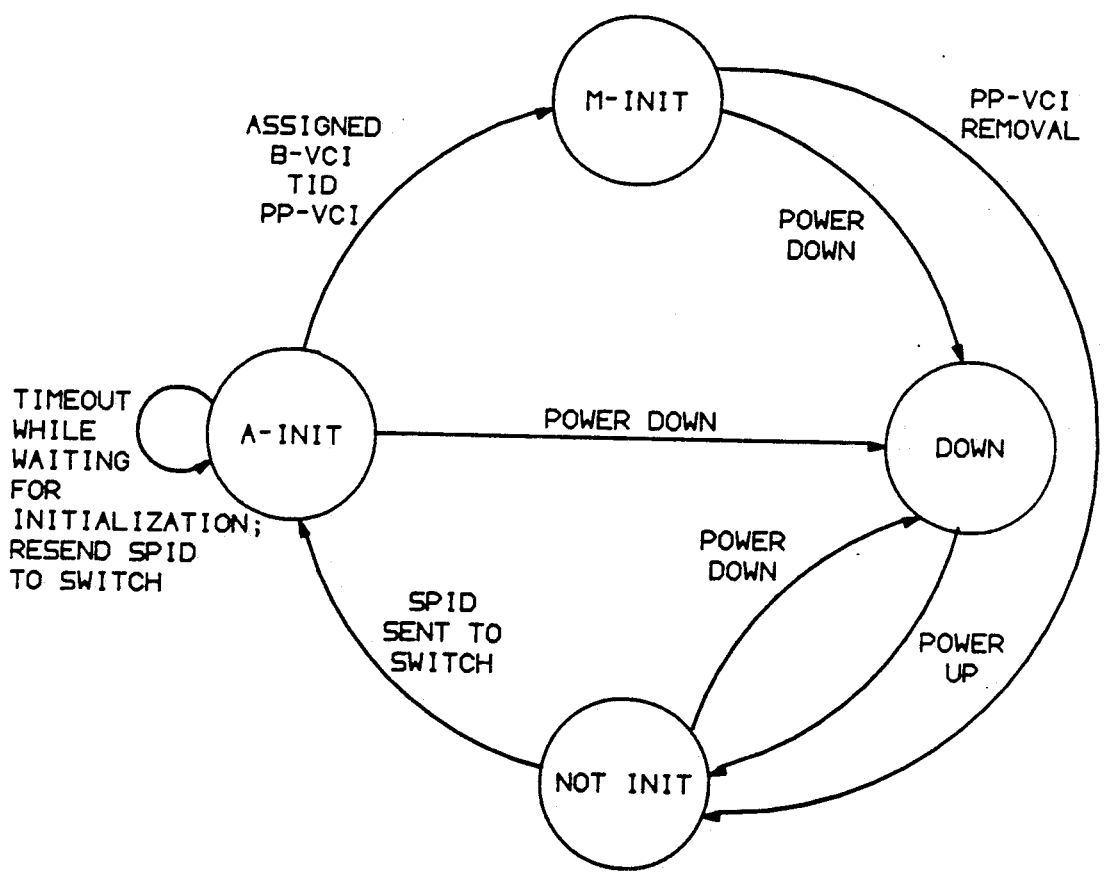
FIG. 17 is a state diagram for a terminal of FIG. 10.

FIG. 17 illustrates the set of possible initialization state transitions for the terminals shown in FIG. 10. At any given time, each of the terminals shown in FIG. 10 is in one of four states, DOWN, Not Initialized (NOT-INIT), Awaiting Initialization (A-INIT), and Multipoint Initialized (M-INIT). For example, consider the state transitions made by terminal 2310, which represents the transitions made by each of the terminals 2310 through 2550. Terminal 2310 is in the DOWN state when it is powered down. It moves from this state to the NOT-INIT state on power up.

Terminal 2310 moves from the NOT-INIT state to the A-INIT state after transmitting a message containing its service profile identifier to switch 1000 requesting initialization. When power is turned off, terminal 2310 returns to the DOWN state.

If terminal 2310 receives a message from switch 1000 addressed by a USID-TID address parameter while terminal 2310 is in the A-INIT state, terminal 2310 discards the message and transmits a message to switch 1000 indicating that terminal 2310 requires initialization. Terminal 2310 moves from the A-INIT state to the NOT-INIT state when terminal endpoint identifier removal takes place at layer 2. When power is turned off, terminal 2310 returns to the DOWN state. Terminal 2310 moves from the A-INIT to the M-INIT state when the terminal has received a message from switch 1000 assigning a USID and TID pair to the terminal and has transmitted a message to switch 1000 acknowledging receipt of the USID and TID.

Terminal 2310 is in the M-INIT state following invocation and successful completion of initialization procedures. The only state from which terminal 2310 enters the M-INIT state is the A-INIT state. When switch 1000 requests reinitialization of the terminal while it is in the M-INIT state, terminal 2310 remains in the M-INIT state throughout the initialization procedures. If a message from switch 1000 containing a new USID and TID assignment is received when terminal 2310 is in the M-INIT state, no state change takes place and terminal 2310 transmits a message to switch 1000 acknowledging receipt of the USID and TID. When terminal endpoint identifier removal procedures take place at layer 2, terminal 2310 enters the NOT-INIT state. When power is turned off, terminal 2310 enters the DOWN state.

Terminal 2310 sends a message to switch 1000 to request initialization when any of the following events take place. Terminal 2310 establishes Layer 2 Terminal 2310 receives a message containing a USID-TID address while in the A-INIT state. Service profile identifier assignment or re-assignment takes place at terminal 2310. Terminal 2310 receives a message from switch 1000 indicating an Initialization Request.

Terminal 2310 transmits the message requesting initialization once, and does not retransmit the message until a future occurrence of an event listed above. If terminal 2310 is in the NOT-INIT state, it moves to the A-INIT state after transmitting the message requesting initialization. If terminal 2310 is in the A-INIT or the M-INIT states, it does not change state.

Figure 18:
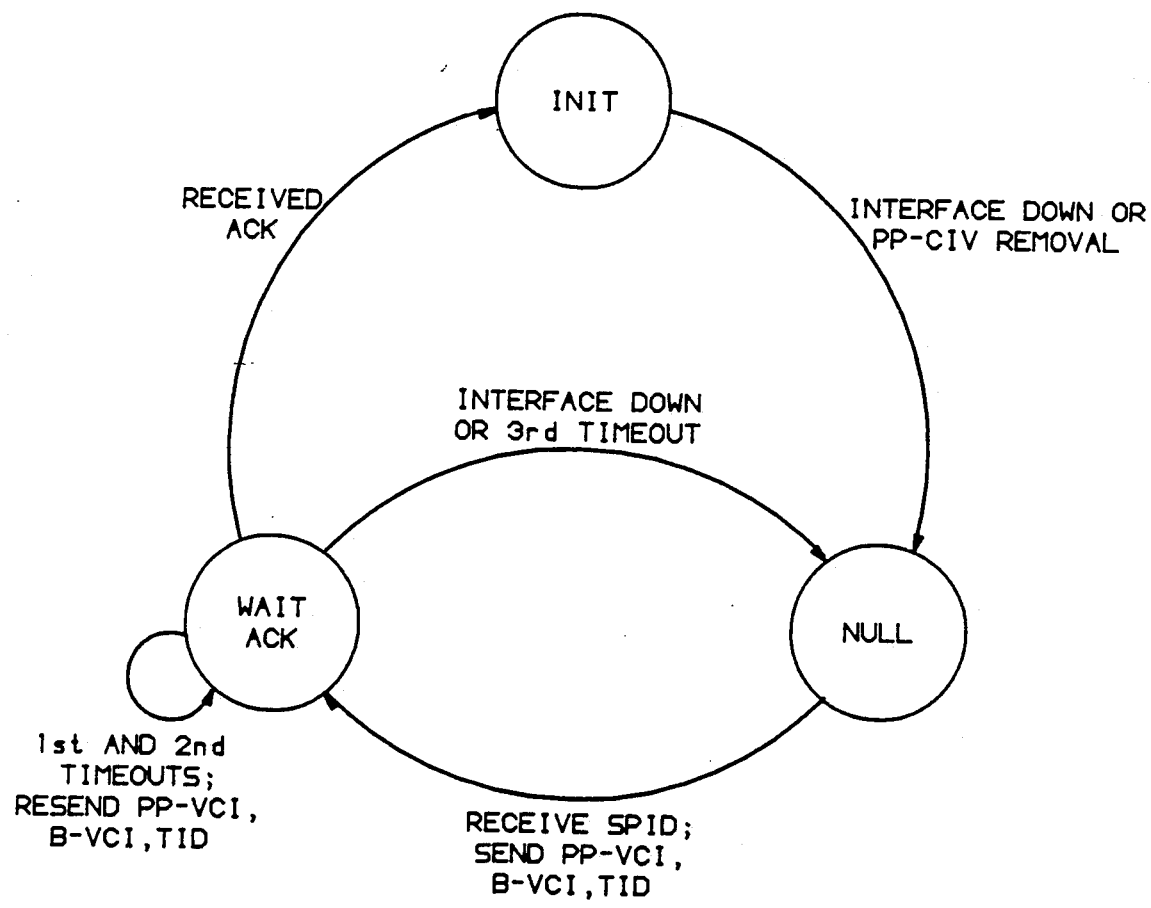
FIG. 18 is a state diagram for the switch of FIG. 10.

FIG. 18 describes the set of possible state transitions for switch 1000. At any given time, with respect to a particular terminal, switch 1000 is in one of five initialization states, NULL, Not Initialized (NOT-INIT), Wait for SPID (WAIT-SPID), Wait for USID-TID Acknowledgement (WAIT-USID-ACK) or Initialized (INIT). For example, consider the state of switch 1000 with respect to terminal 2310.

Switch 1000 is in the NULL state when terminal 2310 has not been assigned a terminal endpoint identifier value. Switch 1000 moves from this state to the NOT-INIT state when a terminal endpoint identifier is assigned to terminal 2310.

Switch 1000 is in the NOT-INIT state when terminal 2310 has been assigned a terminal endpoint identifier value but has not been associated with a service profile in memory 3000 of switch 1000. Switch 1000 moves from the NOT-INIT state to the WAIT-SPID state after transmitting a message to terminal 2310 directing terminal 2310 to request initialization and send the terminal's service profile identifier to switch 1000. While in the NOT-INIT state, when switch 1000 receives a message from terminal 2310 requesting initialization and containing a service profile identifier, switch 1000 assigns a USID-TID value to terminal 2310 and enters the WAIT-USID-ACK state. Terminal endpoint identifier removal at terminal 2310 results in switch 1000 moving from the NOT-INIT state to the NULL state.

Switch 1000 enters the WAIT-SPID state after it has sent a message to terminal 2310 directing the terminal to request initialization. After sending a message to terminal 2310 directing the terminal to request initialization, if switch 1000 does not receive a response (an initialization request containing a service profile identifier parameter) from terminal 2310 within a predetermined time, switch 1000 retransmits the request once and remains in the WAIT-SPID state. If switch 1000 does not receive a response to the retransmission after predetermined time, the switch will provide default service to the terminal as discussed below.

After receipt of the service profile identifier from terminal 2310 switch 1000 assigns a USID-TID value to terminal 2310, sends a message containing the USID-TID value to terminal 2310, and moves to the WAIT-USID-ACK state. The USID and TID values are assigned to the terminal based on the validity of the transmitted service profile identifier. If switch 1000 finds a service profile corresponding to the service profile identifier, switch 1000 transmits a message containing the corresponding USID and TID pair. If no corresponding service profile is found, switch 1000 transmits a message containing a USID and TID value that is associated with a default service profile on digital subscriber line 31. Associated with each digital subscriber line is such a profile specifying the default service for the digital subscriber line. Default service is determined as a subscription option on a digital subscriber line basis.

Switch 1000 moves to the WAIT-USID-ACK state after sending terminal 2310 a USID-TID value and awaits acknowledgement from terminal 2310 that it has received these parameters. On receipt of this acknowledgement, switch 1000 moves to the INIT state. When switch 1000 transmits a message to assign a USID-TID value to terminal 2310, but does not receive an acknowledgement from the terminal within predetermined time, switch 1000 retransmits the message. If switch 1000 again fails to receive an acknowledgement from terminal 2310 within a predetermined time, switch 1000 considers this a protocol error and moves to the INIT state.

Switch 1000 is in the INIT state with respect to terminal 2310 when the terminal has been associated with a service profile in block 100 of memory 3000. Switch 1000 moves to the WAIT_USID_ACK state when terminal 2310 sends a different service profile identifier to the switch. Switch 1000 moves to the NULL state when terminal endpoint identifier removal occurs on the layer 2 link between terminal 2310 and the switch.

Switch 1000 sends a message to the terminal(s) on a digital subscriber line directing the terminals to request initialization in the following instances:

(1) Switch 1000 detects too many errors in the TEI to (USID:TID) mappings for the digital subscriber line.
(2) Switch 1000 has undergone an initialization procedure due, for example, to a power loss then restoral. In this instance, the switch controls the requests for initialization so as not to flood the switch.
(3) As a periodic maintenance activity.
(4) When switch 1000 detects that layer 1 comes up on the digital subscriber line.

To begin the initialization procedure, switch 1000 transmits a message via a point-to-point or the broadcast link to one or more terminals on the digital subscriber line. This message directs the terminal(s) to send a message to the switch requesting initialization and containing the terminal's service profile identifier. All initialized and uninitialized terminals (i.e. terminals in the M-INIT, and the A-INIT or NOT-INIT states, respectively) that receive this message respond by transmitting an initialization request containing the service profile identifier parameter currently resident in the terminal's memory.

When terminal 2310 attempts to request service before completion of initialization procedures, switch 1000 buffers the request for processing after switch 1000 has established the service profile relationship.

Broadband ISDN Embodiment

The principles of the present invention are also applicable in the context of a broadband integrated services digital network (BISDN) switch 11000 (FIG. 10). The broadband aspects of ISDN are described in the T1S1 technical subcommittee baseline document "T1S1-1/88-555" of Dec., 1988, incorporated by reference herein. Switch 11000 includes a switching network 11010, which represents, a plurality of Asynchronous Transfer Mode (ATM) switching units and a plurality of circuit switch units to provide ATM connections, and a plurality of service module units (interconnected via the ATM switch unit and/or the circuit switch units to provide higher layer services e.g. connectionless data services). Switch 11000 further includes control arrangement 11020 that represents the control portion of the system (e.g. including a central control and a plurality of distributed control units).

Each of three BISDN user network interfaces (UNIs) 131, 141, and 151 connected to switch 11000 provides approximately 135,632 kb/s of user accessible bandwidth or approximately 544,092 kb/s of user accessible bandwidth. While all terminals connected to each BISDN UNI receive the total bandwidth, each terminal does not always require the entire bandwidth. To increase bandwidth usage and decrease outside-plant wiring costs, the connection of multiple terminals to a single BISDN UNI in a point-to-multipoint configuration is allowed.

The process used by switch 11000 to relate each terminal in a point-to-multipoint configuration with subscribed service information stored in memory 13000 of switch 11000 is defined below. First, an example is presented to illustrate how switch 11000 initializes the relationship between a terminal and subscribed service information. Next, several examples are presented to show how switch 11000 uses addressing parameters assigned during the initialization procedure to address individual terminals as well as related groups of terminals. Uses for this addressing method in call processing are also shown. Finally, a more detailed definition of the initialization procedure is given.

The following example illustrates the initialization procedure. In this example, user A has three terminals 12310, 12320, and 12330. All of user A's terminals 12310, 12320, and 12330 are connected to switch 11000 via BISDN UNI 131. User B has two terminals 12340 and 12410. Terminal 12340 is connected to switch 1000 via BISDN UNI 131 and terminal 12410 is connected to switch 11000 via BISDN UNI 141.

CCITT Draft Recommendation I.150 defines the ATM layer protocol implemented by switch 11000. The ATM protocol defines address parameters, the Virtual Path Identifier (VPI) and Virtual Channel Identifier (VCI) identify a Virtual Channel on a given BISDN UNI. A point-to-point signaling Virtual Channel will be assigned to each terminal. The identifier of this Virtual Channel (i.e. combined VPI and VCI value) will be called the Point-to-Point signaling Virtual Channel Identifier (PP-VCI). A broadcast signaling Virtual Channel will be assigned to each terminal. The identifier of this Virtual Channel (i.e. combined VPI and VCI value) will be called the Broadcast signaling Virtual Channel Identifier (B-VCI). Each terminal 12310, 12320, 12330, 12340, and 12410 includes a memory to store the PP-VCI, the B-VCI, and other addressing parameters assigned to the terminal. For example, terminal 12310 includes memory 17310. The metasignaling Virtual Channel, VPI value of 0 and the VCI value of 1, is used to perform the initialization procedure for terminals on a given BISDN UNI. When switch 11000 transmits a message using the PP-VCI for a specific terminal, this is referred to as transmitting on a point-to-point link. When switch 11000 transmits a message using the B-VCI for a service profile, this is referred to as broadcasting.

Service profiles stored in a block 1100 (FIG. 11) of memory 13000 describe the directory numbers and services to which a user has subscribed. Service profile SP1 (FIG. 11) defines the directory numbers and the services subscribed to by user A for terminals 12310 and 12320. Service profile SP2 defines services subscribed to by user A for terminal 12330. Service profile SP3 defines services subscribed to by user B for terminals 2340 and 12410. Service profiles may contain but are not limited to containing the following information: (1) Primary directory number (described later herein); (2) List of all directory numbers used to call terminals that are defined by the service profile; (3) For each directory number defined in the profile, any special actions to be taken for calls to that directory number (e.g. service profile SP1 specifies audible alerting for DN1); (4) List of BISDN UNIs on switch 11000 and B-VCI values (described later herein); (5) List of services and related data (e.g. speed calling and speed call list); (6) Data specifying the function of terminal feature buttons.

In the present example, user A subscribes to conflicting features. User A therefore requires multiple service profiles. User A requires one speed call list for terminals 12310 and 12320 and a different speed call list for terminal 12330. Further, user A requires terminal 12330 to silently alert for calls to DN1 while terminals 12310 and 12320 audibly alert for calls to DN1. Thus, two service profiles are required, one profile for terminals 12310 and 12320 and another profile for terminal 12330.

Service profiles SP1, SP2, and SP3 are initially entered into block 1100 of memory 13000 through service order requests when user A and user B establish BISDN service. Later changes to the service profiles, such as the addition of services, are made by service order requests and the data stored in block 100 of memory 13000 are updated. In addition, some data in the service profiles are updated by the initialization procedure discussed below.

The initialization procedure for relating a given terminal with a service profile stored in block 1100 of memory 13000 is illustrated using terminal 12310. During the following initialization procedure, switch 11000 stores data in memory 13000 relating terminal 12310 on BISDN UNI 131 to service profile SP1 and assigns address parameters to terminal 12310. The relationship created between terminal 12310 and service profile SP1, however, is only transitory. The initialization procedure is repeated when terminal 12310 undergoes PP-VCI removal or when other events described herein occur.

The service profile identifier (SPID), a terminal resident parameter, identifies the service profile describing the services subscribed for a terminal. In this exemplary embodiment, the service profile identifier consists of two fields: the primary directory number (PDN) and the primary directory number index. However, other naming conventions may be used for the service profile identifier. Each user has a unique primary directory number and all terminals with the same primary directory number belong to the same user. User A's primary directory number is DN1. User B's primary directory number is DN2. Although a single terminal may have several directory numbers, every terminal has a directory number that is considered its primary directory number. The primary directory number index is used in combination with the primary directory number to identify a particular service profile when a user has multiple service profiles. This naming convention uniquely identifies a service profile over the entire switching system. Following this naming convention, the service profile identifier for user A's terminals 12310 and 12320 is (DN1:1). The service profile identifier for user A's terminal 12330 is (DN1:2). The service profile identifier for user B's terminals 12340 and 12410 is (DN2:1).

A network administrator provides service profile identifiers to a user when the user subscribes to the BISDN service. The service profile identifier for terminal 12310 is stored in a non-volatile memory block 1600 (FIG. 12) of memory 17310 to retain the service profile identifier even if terminal 2310 loses power. User A initializes or changes the service profile identifier by interacting with terminal 12310 in a local mode and entering the desired value into block 1600. User A initializes the value of the service profile identifier stored in block 1600 of memory 17310 to the primary directory number and primary directory number index for terminal 12310, (DN1:1).

Either the switch or the terminal may invoke initialization. FIG. 13 shows the messages exchanged when the terminal invokes initialization while FIG. 14 shows the messages exchanged when the switch invokes initialization. Terminal 12310 invokes initialization by transmitting an initialization request containing its service profile identifier and a Reference Number to switch 11000. Switch 11000 invokes initialization by transmitting a message to terminal 12310 requesting terminal 12310 to transmit its service profile identifier to switch 11000. This additional message is the only difference between switch invoked and terminal invoked procedures. When terminal 12310 receives a message from switch 11000 requesting that it transmit its SPID, terminal 12310 responds with the same message that it transmits to invoke initialization.

In the present example, terminal 12310 invokes initialization by transmitting a message to switch 11000 containing its service profile identifier, (DN1:1), and a Reference Number. The Reference Number is a random number that terminal 12310 generates. In response to the message transmitted by terminal 12310, switch 11000 searches block 1100 of memory 13000 for a service profile identified by (DN1:1). The search is successful and shows that service profile identifier (DN1:1) identifies service profile SP1.

Next, switch 11000 assigns a Broadcast signaling Virtual Channel Identifier (B-VCI), a Point-to-Point signaling Virtual Channel Identifier (PP-VCI), and a terminal identifier (TID) to terminal 12310. A B-VCI is an addressing parameter used by switch 11000 in ATM cells. A B-VCI uniquely identifies a service profile on a given BISDN UNI and is used to address all terminals with the same service profile. The B-VCI has significance only on a given BISDN UNI while the service profile identifier has significance over the entire switch 11000. The TID, which in this exemplary embodiment ranges in value from 0 to 32,767, when combined with a B-VCI identifies a specific terminal on a given BISDN UNI. The TID value of 32,767, referred to as the global TID, is used as a wild card value. A B-VCI and TID parameter with the TID set to 32,767 addresses all terminals with the value specified in the B-VCI.

To assign a B-VCI to terminal 12310, switch 11000 first reads data stored in service profile SP1 to determine if a B-VCI has been assigned on BISDN UNI 131 for service profile SP1. Service profile SP1 contains a relation defining BISDN UNI and B-VCI pairs allocated for service profile SP1. The relation is keyed by BISDN UNI and includes one non-key attribute, B-VCI. Switch 11000 reads the relation using a key value of 131 corresponding to BISDN UNI 131, but finds no tuple with that key value. Accordingly, switch 11000 inserts a tuple, (131, 10), into the relation in service profile SP1. This allocates a B-VCI with value of 10 to service profile SP1 on BISDN UNI 131 (i.e. VPI value 0 and VCI value 10 is used for sending broadcast messages for terminals with service profile SP1). Switch 11000 also inserts a tuple into a relation in a block 1400 (FIG. 11) of memory 13000 that relates a BISDN UNI and B-VCI to a service profile identifier. This relation is keyed by a compound key formed from BISDN UNI and B-VCI and contains one non-key attribute, service profile identifier. Switch 11000 inserts the tuple (131, 10, DN1:1).

Switch 11000 assigns the PP-VCI for terminal 12310 by obtaining a value for a VPI and VCI pair that is not already in use on BISDN UNI 131. This allocates a PP-VCI value of 65 to terminal 12310 (i.e. VPI value 0 and VCI value 65 is used for sending point-to-point messages for terminal 12310). Switch 11000 assigns the TID for terminal 12310 by obtaining a value that is not already in use on BISDN UNI 131 for SP1. This allocates a TID value of 1 to terminal 12310. Service profile SP1 contains a relation relating B-VCI, TID, and PP-VCI for a given BISDN UNI. Switch 11000 inserts the tuple (131, 10, 1, 65) into this relation.

Next, switch 1000 stores the received service profile identifier, (DN1:1), in the data block 1530 of memory 13000. This establishes a relationship between terminal 12310, identified by a BISDN UNI and PP-VCI pair, (131:65), and the service profile SP1, identified by the service profile identifier (DN1:1).

Switch 11000 transmits the assigned (B-VCI:TID:PP-VCI), (10:1:65), to terminal 12310 in a message on the metasignaling channel. Switch 11000 includes the Reference Number it received from terminal 12310 in this message. On receipt of the message from switch 11000, terminal 12310 first compares the Reference Number in the received message with the Reference Number that terminal 12310 inserted in the request message. In the present example, the Reference Numbers are the same, indicating that the message is not a coincidental response to a request from another terminal on BISDN UNI 131. Terminal 12310 then stores the B-VCI, TID, and PP-VCI in block 1700, block 1800, and block 1900 (FIG. 12) respectively of memory 17310. Terminal 12310 transmits a message to switch 11000 acknowledging receipt of the (B-VCI:TID:PP-VCI). This message also includes the same Reference Number used to request the (B-VCI:TID:PP-VCI).

A similar procedure is followed for initialization of user A's other terminals 12320 and 12330 as well as user B's terminals 12340 and 12410. Table 6 presents the parameters that exist after the above initialization procedure is completed for terminals 12310, 12320, 12330, 12340, and 12410.

TABLE 6

| USER TERMINAL | USER "A" 12310 | USER "A" 12320 | USER "A" 12330 | USER "B" 12340 | USER "B" 12410 |
|---|---|---|---|---|---|
| (BISDN UNI:PP-VCI) | (131:65) | (131:87) | (131:76) | (131:68) | (141:65) |
| (BISDN UNI:B-VCI:TID) | (131:10:1) | (131:10:3) | (131:7:2) | (131:12:1) | (141:7:2) |
| SPID | (DN1:1) | (DN1:1) | (DN1:4) | (DN2:0) | (DN2:0) |

This example illustrates the association of more than one terminal with a single service profile and the location of terminals associated with the same service profile on the same BISDN UNI or on separate BISDN UNIs. Since the relationship between a particular terminal and a given service profile is not statically assigned at subscription time but is instead dynamically established by the above initialization procedure, a user may add terminals or move terminals between BISDN UNIs at the user's convenience.

The service profile information for this two user example is found in Table 7.

TABLE 7

| SERVICE PROFILE | SP1 | SP2 | SP3 |
| --- | --- | --- | --- |
| SPID | DN1:1 | DN1:4 | DN2:0 |
| PDN | DN1 | DN1 | DN2 |
| DNs | DN1-Aud. Alert | DN1-Silent Alert for 20 sec. | DN2-Aud. Alert |
| (BISDN UNI:B-VCI) | (131:10) | (131:7) | (131:2) |
|  |  |  | (141:7) |
| (BISDN UNI:B-VCI:TID:PP-VCI) | (131:10:1:65) | (131:7:1:76) | (131:2:1:68) |
|  | (131:10:2:87) |  | (141:7:2:65) |
| SERVICES | Speed Call List 1 | Speed Call List 2 |  |

Signaling messages will be conveyed between the network and the switch using the ATM protocol. A signaling message will be transmitted in one or more cells (the number of cells used is dependent on the size of the message since each ATM cell has a payload of 48 bytes). A terminal will screen signaling messages based on the ATM cell header addressing fields (i.e. the VPI and VCI fields). A terminal will ignore all ATM cells it receives that have addressing field values that it does not recognize. In particular, signaling messages will only be processed if the messages are transported on either the point-to-point signaling Virtual Channel assigned to the terminal, i.e. specified by the value of PP-VCI, or on the broadcast signaling Virtual Channel assigned to the terminal, i.e. specified by the value of B-VCI. This can greatly reduce the number of signaling messages a terminal need process. Upon receiving a SETUP message on its broadcast Virtual Channel, a terminal will process the SETUP message and examine the TID parameter. If the TID matches that stored in the terminals memory it will continue processing the SETUP message. Otherwise, the terminal will discard the SETUP message.

Switch 11000 uses the B-VCI and TID parameters assigned to terminals 12310, 12320, 12330, 12340, and 12410 to address individual terminals or groups of related terminals on BISDN UNIs 131, 141, and 151. To transmit a message to terminal 12310 on BISDN UNI 131, switch 11000 addresses the message with a (B-VCI:TID) pair of (10:1). The (B-VCI:TID) pair (10:1) uniquely identifies terminal 12310 on BISDN UNI 131. Assume that switch 11000 transmits this message on BISDN UNI 131 using B-VCI 10 in the address field (i.e. the VPI and VCI fields) of the ATM cell header. Each of the terminals 12310, 12320, 12330, and 12340 will compare the address field in the ATM cell header with the ATM address values stored in their memory. Terminal 12320 will examine the address field of every ATM cell it receives. It will not act upon the contents of ATM cell payloads for which it does not recognize the address field in the ATM cell header. Terminal 12320 will recognize the address field of the cells used to transport the above SETUP message since it will recognize the address of 10 as that assign to it via the B-VCI parameter. Therefore, terminal 12320 will reassemble and process the SETUP message. The TID parameter in the SETUP message does not match the TID stored in memory 17320 so terminal 12320 discards the message. Terminals 12330 and 12340 will not recognize the address field of the cells used to transport the above SETUP message and therefore will not reassemble or process the message. Terminal 12310, on the other hand, will reassemble and process the SETUP message since it will recognize the address in the ATM cell headers as the address assigned to it by the B-VCI parameter. In processing the SETUP message, terminal 12310 compares the TID in the message with the TID stored in block 1800 of memory 17310 and determines that the values match. Thus, terminal 12310 will process the rest of the message.

To transmit a message to all terminals sharing a specific service profile on the given BISDN UNI, switch 1000 addresses the message with the B-VCI identifying the specific service profile on BISDN UNI 131 and the global TID. Consider an example of switch 11000 sending a message to all terminals for service profile SP1 on BISDN UNI 131. Service profile SP1 is identified on BISDN UNI 131 by a B-VCI value of 10. Switch 11000 addresses the message with a (B-VCI:TID) parameter of (10:32,767), corresponding to the specific B-VCI and the global TID. Switch 11000 broadcasts this message on BISDN UNI 131 using the Virtual Channel specified by B-VCI 10. Terminals 12330 and 12340 will not recognize the address field of the cells used to transport the above SETUP message and therefore will not reassemble or process the message. Thus, terminals 12330 and 12340 will not respond to the message. Terminal 12310 and 12320, however, both will recognize the address field of the cells used to transport the above SETUP message since they will recognize the address of 10 as that assign to them via the B-VCI parameter. Thus terminals 12310 and 12320 will reassemble and process the SETUP message. Since the message contains the global TID, terminal 12310 and 12320 do not perform any comparison on the TID. Both terminal 12310 and terminal 12320 will process the rest of the message.

The B-VCI and TID addressing scheme also allows switch 11000 to address all but one specific terminal associated with a given service profile. Two octets are allocated in messages for the TID and an interpreter bit. The 15 low order bits in the two octets are used to represent the TID, which ranges in value from 0 to 32,767, and the high order bit of the two octets is used as the interpreter bit. When the interpreter bit is set to 0, as has been assumed in all the previous examples and all other examples unless specifically stated, the terminals interpret the B-VCI and TID address as illustrated by the examples above. When the interpreter bit is set to 1, terminals interpret the address as specifying all terminals with the indicated B-VCI except the terminal specified by the TID. Consider the following example of transmitting a message to all terminals for service profile SP1 on BISDN UNI 131 except terminal 12320. Service profile SP1 is identified on BISDN UNI 131 by a B-VCI value of 10. In preparing the message, switch 11000 sets the interpreter bit to 1, and sets the remaining 15 bits in the octet specifying the TID to the TID value of 3 corresponding to terminal 12320. Switch 11000 transmits the message on BISDN UNI 131 using the Virtual Channel identified by B-VCI value of 10. Since, as discussed in the above examples, the terminals 12330 and 12340 will not recognize the address field in the ATM cell(s) used to transport the SETUP message and therefore will not respond to the message. Both terminal 12310 and 12320 will recognize the address field of the cells used to transport the above SETUP message since they will recognize the address of 10 as that assign to them via the B-VCI parameter. Thus terminals 12310 and 12320 will reassemble and process the SETUP message. Terminal 12320 compares the TID specified in the message with the TID stored in memory 17320. The TID specified in the message matches the corresponding values in memory 17320. Since the interpreter bit is set to 1 and the TID matches, the terminal recognizes that the message is not addressed to it and discards the message. Terminal 12310 compares the TID specified in the message with the B-VCI and TID stored in memory 17310. The TID does not match. Since the interpreter bit is set to 1, terminal 12310 processes the rest of the message.

The following examples illustrate the use of the B-VCI and TID by switch 11000 in call processing. In these examples, user C, identified by primary directory number DN4, has one terminal 12510. User D, identified by primary directory number DN5, has three terminals 12520, 12530, and 12540. User E, identified by primary directory number DN6, has one terminal 12550. Each of the five terminals is located on BISDN UNI 151.

Assume that terminals 12510, 12520, 12530, 2540, and 2550 have completed the above initialization procedure and that the address parameters shown in Table 8 have been assigned.

Switch 11000 addresses an individual terminal when providing recall services such as automatic call back calling. For example, assume terminal 12510 invokes auto call back calling. When terminal 12510 invokes the service, switch 11000 saves the B-VCI and the TID of terminal 12510, (10:1). To recall terminal 12510, switch 11000 broadcasts a SETUP message on BISDN UNI 151 addressed with the saved B-VCI and TID, (10:1).

The next example illustrates use of the B-VCI and TID addressing parameters in call offering. FIG. 15 is a diagram of the message flow between switch 11000 and terminals 12510 and 12550 for this example. For an incoming call, switch 11000 uses the directory number mapping relation stored in block 1200 of memory 13000 (FIG. 11) to map the called directory number to (BISDN UNI:B-VCI) pairs corresponding to each BISDN UNI and service profile combination related to the directory number. Data is inserted in the directory number mapping table through service orders when a user subscribes to a directory number. Table 10 defines the directory number mapping table for the following examples. An asterisk denotes that the service profile in the corresponding column subscribes to the called directory number.

TABLE 10

| DN | SP 4 | SP 5 | SP 6 |
| --- | --- | --- | --- |
| DN4 | * |   | * |
| DN5 |   | * | * |
| DN6 |   |   | * |
| DN7 | * | * | * |
| DN8 |   |   | * |

When an incoming call arrives at switch 11000 for

TABLE 8

| USER TERMINAL | USER "C" 12510 | USER "D" 12520 | USER "D" 12530 | USER "D" 12540 | USER "E" 12550 |
| --- | --- | --- | --- | --- | --- |
| (BISDN UNI:PP-VCI) | (151:65) | (151:66) | (151:68) | (151:71) | (151:72) |
| (BISDN UNI:B-VCI:TID) | (151:10:1) | (151:2:1) | (151:2:2) | (151:2:3) | (151:3:1) |
| SPID = | (DN4:1) | (DN5:1) | (DN5:1) | (DN5:1) | (DN6:1) |

Three service profiles SP4, SP5, and SP6 (FIG. 11) define the services subscribed to by these users. Each of the three service profiles SP4, SP5, and SP6 specify key system service. Key-system service allows each of the users C, D, and E to have multiple DNs and to share these DNs with the other users. For calls to DN4 and DN5, service profile SP6 specifies silent alerting followed in 18 seconds by audible alerting if the call has not been answered. Otherwise, audible alerting is specified in service profiles SP4, SP5, and SP6 for all directory numbers. Table 9 illustrates the service profile information for the following examples.

directory number DN4, switch 11000 reads the directory number mapping relation in block 1200 of memory 13000 to determine all service profiles, identified by (BISDN UNI:B-VCI), that subscribe to directory number DN4. The (BISDN UNI:B-VCI) combinations determined are (151:10) and (151:3). Switch 11000 reads the service profiles associated with these (BISDN UNI:B-VCI) combinations to determine if the service profiles specify any special terminating treatment for calls to DN4. The service profiles associated with (151:10) and (151:3) are service profile SP4 and service profile SP6, respectively. Service profile SP4 specifies

TABLE 9

| Service Profile | SP 4 | SP 5 | SP 6 |
| --- | --- | --- | --- |
| SPID | DN4:1 | DN5:1 | DN6:1 |
| PDN | DN4 | DN5 | DN6 |
| DNs | DN4-Aud. Alert | DN5-Aud. Alert | DN4-Silent Alert for 18 sec. |
|   | DN7-Aud. Alert | DN7-Aud. Alert | DN5-Silent Alert for 18 sec. |
|   |   |   | DN6-Aud. Alert |
|   |   |   | DN7-Aud. Alert |
| (BISDN UNI:B-VCI) | (151:10) | (151:2) | (151:3) |
| (BISDN UNI:B-VCI:TID:PP-VCI) | (151:10:1:65) | (151:2:1:66) | (151:3:1:72) |
|   |   | (151:2:2:68) |   |
|   |   | (151:2:3:72) |   |
| SERVICES Feature Buttons | Key System 15 - ACBC | Key System | Key System | audible alerting for calls to DN4. Service profile SP6 specifies silent alerting for 18 seconds for calls to DN4 followed by audible alerting.

Switch 11000 offers the call to terminals associated with SP4 by broadcasting a SETUP message addressed with a (B-VCI:TID) address of (10:32,767) on BISDN UNI 151. The SETUP message contains a call reference value of 3, a signal information element specifying audible alerting and a TID value of 32,767. This message is broadcast on the Virtual Channel specified by B-VCI value of 10 on BISDN UNI 151. The call reference value is used by switch 11000 to associate a series of messages.

Switch 11000 offers the call to terminals associated with service profile SP6 also by broadcasting a SETUP message using the Virtual Channel specified by B-VCI value of 3 on BISDN UNI 151. This SETUP message contains a call reference value of 5, a signal information element specifying silent alerting, and a TID value of 32,767.

Since terminal 12510 will recognize the ATM address value of 10 on BISDN UNI (i.e. the B-VCI value of 10 is in memory 17510 of terminal 12510), terminal 12510 will process the SETUP message addressed by the (B-VCI:TID) pair of (10:32,767). In processing the SETUP message, terminal 12510 recognizes the global TID in the message and so terminal 12510 sends an ALERTing message to switch 11000 using the Virtual Channel specified by the PP-VCI value of 65 and begins to audibly alert.

Since terminal 12550 will recognize the ATM addresses value of 3 on BISDN UNI (i.e. the B-VCI value of 3 is in memory 17550 of terminal 12550), terminal 12550 will process the SETUP message addressed by the (B-VCI:TID) pair of (3:32,767). In processing the SETUP message, terminal 12550 recognizes the global TID in the message and so terminal 12550 sends an ALERTing message to switch 11000 using the Virtual Channel specified by the PP-VCI value of 72 and begins to silently alert.

For both SETUP messages, each of terminals 12520, 12530, and 12540 determine that the ATM address specified in the ATM cell header does not match the ATM address values stored in their respective memory and thus these terminals disregard both messages and do not alert.

For the SETUP message addressed with the (B-VCI:TID) pair of (10:32,767), terminals 12550 determines that the ATM address value specified in the ATM cell header does not match the ATM address values stored in its memory 17550 and thus the terminal does not process the message and does not alert.

For the SETUP message addressed with the (B-VCI:TID) pair of (3:32,767), terminals 12510 determines that the ATM address value specified in the ATM cell header does not match the ATM address values stored in its memory 17510 and thus the terminal does not process the message and does not alert.

Finally, if the call is not answered within 18 seconds, switch 11000 sends an INFOrmation message to terminal 12550 containing a call reference value of 5 and a signal information element specifying audible alerting using the Virtual Channel specified by the PP-VCI value of 72.

Notice in this example that switch 11000 addressed the SETUP messages on a service profile basis and did not send individual messages to each terminal. Thus, switch 11000 offers calls on a service profile basis without requiring data defining how many terminals are associated with a particular service profile. This illustrates the flexibility available to a user in adding or removing terminals without requiring a service order.

The following example shows switch 11000 using the interpreter bit. FIG. 16 illustrates the message flow for this example. Terminal 12520 sends a SETUP message to switch 11000 to place an outgoing call using DN5. On receipt of this message, switch 11000 sends a SETUP ACK message to terminal 12520 on the point-to-point signaling Virtual Channel for terminal 12520. Switch 11000 determines the B-VCI and TID associated with terminal 12520. Next, switch 11000 broadcasts an ASSOC message on BISDN UNI 151 to all terminals that share DN5 to inform the terminals of the call origination. If switch 11000 were to broadcast the message to all terminals sharing service profile SP5, terminal 12520 would receive the message, recognize that the message was addressed to it, and process the message. Terminal 12520 would interpret the message to indicate that it could not originate a call on DN5. To eliminate this ambiguity, switch 11000 uses the interpreter bit to address the ASSOC message to all terminals sharing service profile SP5 except terminal 12520.

Switch 11000 addresses the message using the B-VCI and TID for terminal 12520, (2:1), with the interpreter bit set to 1. Switch 11000 broadcasts this message on BISDN UNI 151 using the Virtual Channel specified by the B-VCI value of 2. Switch 11000 does not have to send individual ASSOC messages to each terminal but instead broadcast messages on a service profile basis. On receipt of the message, terminal 12530 and 12540 both recognize that the message is addressed to them and repond by sending ASSOC_ACK messages to switch 11000. Switch 11000 also sends an ASSOC message to all terminals sharing service profile SP6 since this profile also includes DN5. Switch 11000 addresses this message using the global TID and broadcasts the message on BISDN UNI 151 using the Virtual Channel specified by the B-VCI value for service profile SP6. On receipt of the message, terminal 12550 recognizes that the message is addressed to it and responds by sending an ASSOC_ACK message to switch 11000.

The final example has a terminal transmitting a message to switch 11000 to originate a call or to indicate the activation of some feature at the terminal. Here switch 11000 uses the BISDN UNI:PP-VCI to service profile association that was recorded in the PP-VCI data blocks 1500 at initialization to identify the service profile associated with the terminal. For example, assume user C invokes automatic call back calling by activating feature button 15 on terminal 12510. Terminal 12510 sends a message to switch 11000 indicating that feature button 15 was activated. The message from terminal 12510 is received on the point-to-point signaling Virtual Channel, which has a PP-VCI value of 65, for terminal 12510. Switch 11000 reads data block 1550 of memory 13000 to determine the service profile associated with the PP-VCI value of 65 on BISDN UNI 151. The service profile identifier specified is (DN4:1). Switch 11000 searches block 1100 in memory 13000 for a service profile identified by the service profile identifier, (DN4:1). The service profile that switch 11000 retrieves is service profile SP4. Data in service profile SP4 defines the service associated with the feature buttons on terminal 12510. Switch 11000 reads this data to determine the services associated with feature button 15. The data define feature button 15 as the button for automatic call back calling. Switch 11000 processes the request accordingly.

The following describes in greater detail the states that terminal 12310 and switch 11000 enter during initialization. First, the states and state transitions for terminal 12310 are discussed. Next, the states and state transitions for switch 11000 relating to terminal 12310 are discussed.

FIG. 17 illustrates the set of possible initialization state transitions for the terminals shown in FIG. 10. At any given time, each of the terminals shown in FIG. 10 is in one of four states, DOWN, Not Initialized (NOT-INIT), Awaiting Initialization (A-INIT), and Multipoint Initialized (M-INIT). For example, consider the state transitions made by terminal 12310, which represents the transitions made by each of the terminals 12310 through 12550. Terminal 12310 is in the DOWN state when it is powered down. It moves from this state to the NOT-INIT state on power up.

Terminal 12310 moves from the NOT-INIT state to the A-INIT state after transmitting a message containing its service profile identifier to switch 11000 requesting initialization. When power is turned off, terminal 12310 returns to the DOWN state.

When layer 1 is lost (e.g. the BISDN UNI goes down), terminal 12310 enters the NOT-INIT state. When power is turned off, terminal 12310 returns to the DOWN state. If terminal 12310 does not receive a response (an assignment message containing the BB-VCI, TID, and PP-VCI) from switch 11000 within a predetermined time, terminal 12310 retransmits the message requesting initialization containing the service profile identifier to switch 11000. Terminal 12310 may keep retransmitting the message requesting initialization after each predetermined time period in which it does not receive a response. Alternatively, terminal 12310 may have a counter of maximum number of retransmission attempts. If after this maximum number of retransmissions is reached without a response, terminal 12310 will enter the NOT-INIT state. Terminal 12310 moves from the A-INIT to the M-INIT state when the terminal has received a message from switch 11000 assigning a B-VCI, TID, and PP-VCI to the terminal and has transmitted a message to switch 11000 acknowledging receipt of the B-VCI, TID, and PP-VCI.

Terminal 12310 is in the M-INIT state following invocation and successful completion of initialization procedures. The only state from which terminal 12310 enters the M-INIT state is the A-INIT state. When switch 11000 requests reinitialization of the terminal while it is in the M-INIT state, terminal 12310 remains in the M-INIT state throughout the initialization procedures. If a message from switch 11000 containing a new B-VCI, TID, and PP-VCI assignment is received when terminal 12310 is in the M-INIT state, no state change takes place and terminal 12310 transmits a message to switch 11000 acknowledging receipt of the B-VCI, TID, and PP-VCI. When layer 1 is lost (e.g. the BISDN UNI goes down), terminal 12310 enters the NOT-INIT state. When power is turned off, terminal 12310 enters the DOWN state.

Terminal 12310 sends a message to switch 11000 to request initialization when any of the following events take place.

(1) Terminal 12310 establishes Layer 1.
(2) Terminal 12310 has waited the predetermined time without a response while in the A-INIT state.
(3) Service profile identifier assignment or re-assignment takes place at terminal 12310.
(4) Terminal 12310 receives a message from switch 11000 indicating an Initialization Request.
(5) Removal of the Virtual Channel assigned for point-to-point signaling (i.e. the Virtual Channel specified by the value of PP-VCI in the assignment message). This Virtual Channel is removed upon an explicit request by switch 11000 or when terminal 12310 loses communication to switch 11000 on the Virtual Channel and can not re-establish communication to switch 11000.

Terminal 12310 transmits the message requesting initialization once, and does not retransmit the message until a future occurrence of an event listed above. If terminal 12310 is in the NOT-INIT state, it moves to the A-INIT state after transmitting the message requesting initialization. If terminal 12310 is in the A-INIT or the M-INIT states, it does not change state.

FIG. 18 describes the set of possible state transitions for switch 11000. At any given time, with respect to a particular terminal, switch 11000 is in one of three initialization states, NULL, Wait for B-VCI, TID, and PP-VCI assignment Acknowledgement (WAIT-ACK), or Initialized (INIT). For example, consider the state of switch 11000 with respect to terminal 12310.

Switch 11000 is in the NULL state when it has not received an initialization request message containing a service profile identifier from terminal 12310. While in the NULL state, when switch 11000 receives a message from terminal 12310 requesting initialization and containing a service profile identifier, switch 11000 assigns B-VCI, TID, and PP-VCI values to terminal 12310, sends a message containing the B-VCI, TID, and PP-VCI values to terminal 12310, and moves to the WAIT-ACK state. The B-VCI, TID, and PP-VCI values are assigned to the terminal based on the validity of the transmitted service profile identifier. If switch 11000 finds a service profile corresponding to the service profile identifier, switch 11000 transmits a message containing the corresponding B-VCI, TID, and PP-VCI values. If no corresponding service profile is found, switch 11000 transmits a message containing B-VCI, TID, and PP-VCI values that are associated with a default service profile on BISDN UNI 31. Associated with each BISDN UNI is such a profile specifying the default service for the BISDN UNI. Default service is determined as a subscription option on a BISDN UNI basis. Loss of layer 1 for BISDN UNI 31, i.e. the interface for terminal 12310, results in switch 11000 moving from the WAIT-ACK state to the NULL state.

Switch 11000 moves to the WAIT-ACK state after sending terminal 12310 B-VCI, TID, and PP-VCI values and awaits acknowledgement from terminal 12310 that it has received these parameters. On receipt of this acknowledgement, switch 11000 moves to the INIT state. When switch 11000 transmits a message to assign B-VCI, TID, and PP-VCI values to terminal 12310, but does not receive an acknowledgement from the terminal within a predetermined time, switch 11000 retransmits the message. If switch 11000 again fails to receive an acknowledgement from terminal 12310 within a predetermined time, switch 11000 considers this a protocol error and moves to the INIT state.

Switch 11000 is in the INIT state with respect to terminal 12310 when the terminal has been associated with a service profile in block 1100 of memory 13000. Switch 11000 moves to the WAIT-ACK state when terminal 12310 sends a different service profile identifier to the switch. Switch 11000 moves to the NULL state when removal of the Virtual Channel assigned for point-to-point signaling for terminal 12310 occurs.

Switch 11000 sends a message to the terminal(s) on a BISDN UNI directing the terminals to request initialization in the following instances:

(1) Switch 11000 detects too many errors in the PP-VCI to (B-VCI: TID) mappings for the BISDN UNI.
(2) Switch 11000 has undergone an initialization procedure due, for example, to a power loss then restoral.
(3) As a periodic maintenance activity.
(4) When switch 11000 detects that layer 1 comes up on the BISDN UNI.

To begin the initialization procedure, switch 11000 transmits a message via the metasignaling Virtual Channel (i.e. the message is broadcast to all terminals sharing the BISDN UNI). This message directs the terminal(s) to send a message to the switch requesting initialization and containing the terminal's service profile identifier. All initialized and uninitialized terminals (i.e. terminals in the M-INIT, and the A-INIT or NOT-INIT states, respectively) that receive this message respond by transmitting an initialization request containing the service profile identifier parameter currently resident in the terminal's memory. Switch 11000 can also send a message to begin initialization that will only cause uninitialized terminals (i.e. terminals in the A-INIT or NOT-INIT states) to respond by transmitting an initialization request containing the service profile identifier parameter currently resident in the terminal's memory.

It is to be understood that the above-described arrangements are merely illustrative of the principles of the invention and that many variations may be devised by those skilled in the art without departing from the spirit and scope of the invention.

We claim:

1. An initialization method for a switch connectable via a single line to a plurality of terminals, said switch including means for storing a plurality of service profiles each defining a set of call services, said method comprising
    said switch receiving on said line a first identifier defining one of said plurality of terminals and a second identifier defining one of said plurality of service profiles,
    in response to receipt of said first and second identifiers, said switch enabling for said one terminal a set of call services defined by said one service profile,
    in response to receipt of said second identifier, said switch determining a third identifier distinguishing said one service profile from any other service profiles defining sets of call services enabled for ones of said plurality of terminals, and
    after determining said third identifier, said switch transmitting said third identifier to said one terminal and thereafter addressing said one terminal using said third identifier.

2. A method in accordance with claim 1 wherein said switch is a broadband ISDN switch, wherein said single line comprises a plurality of broadcast signaling virtual channels, wherein said first identifier is a reference number, wherein said second identifier is a service profile identifier, wherein said third identifier is a broadcast signaling virtual channel identifier, and wherein said addressing step comprises:
    said switch sending a plurality of broadcast messages, each comprising a broadcast signaling virtual channel identifier, on said line,
    in response to receipt of said messages, said one terminal only processing ones of said messages wherein the broadcast signaling virtual channel identifier is equal to said third identifier transmitted to said one terminal.

3. A method in accordance with claim 1, wherein said single line comprises a broadcast link and a plurality of point-to-point links, each of said point-to-point links being between said switch and a different one of said plurality of terminals, said method further comprising
    after said transmitting step and in response to an incoming call, said switch transmitting on said broadcast link of said single line a first message concerning said call, said message addressed by said third identifier,
    after transmitting said first message, said switch receiving a second message on the one of said point-to-point links between said switch and said one terminal and
    in response to receipt of said second message, said switch communicating with said one terminal concerning said incoming call using the point-to-point link on which said second message was received.

4. An initialization method for a switch connectable via a single line to a plurality of terminals, said switch including means for storing a plurality of service profiles each defining a set of call services, said method comprising
    said switch receiving on said line a first identifier defining one of said plurality of terminals and a second identifier defining one of said plurality of service profiles,
    in response to receipt of said first and second identifiers, said switch enabling for said one terminal a set of call services defined by said one service profile,
    in response to said receipt of said second identifier, determining a third identifier distinguishing said one service profile from any other service profiles defining sets of call services enabled for ones of said plurality of terminals, and determining a fourth identifier distinguishing said one terminal from any other ones of said plurality of terminals for which said set of call services defined by said one service profile is enabled, and
    after determining said third and fourth identifiers, said switch transmitting said third and fourth identifiers to said one terminal and thereafter addressing said one terminal using said third and fourth identifiers.

5. A method in accordance with claim 4 where said first and fourth identifiers are identical.

6. An initialization method for a switch connectable via a single line to a plurality of terminals, said switch including means for storing a plurality of service profiles each defining a set of call services, said method comprising
    said switch receiving on said line a first identifier defining one of said plurality of terminals and a second identifier defining one of said plurality of service profiles,
    in response to receipt of said first and second identifiers, said switch enabling for said one terminal a set of call services defined by said one service profile, said switch receiving on said line an identifier defining another of said plurality of terminals and an identifier identical to said second identifier defining said one service profile, in response to receipt of said identifier defining said another terminal and said identifier identical to said second identifier, said switch enabling for said another terminal said set of call services defined by said one service profile, in response to said receipt of said second identifier, said switch determining a third identifier distinguishing said one service profile from any other service profiles defining sets of call services enabled for ones of said plurality of terminals, after determining said third identifier, said switch transmitting said third identifier to said one terminal and thereafter addressing said one terminal using said third identifier, and in response to said receipt of said identifier identical to said second identifier and after determining said third identifier, said switch transmitting said third identifier to said another terminal and thereafter addressing said another terminal using said third identifier.

7. An initialization method for a switch connectable via a single line to a plurality of terminals, said switch including means for storing a plurality of service profiles each defining a set of call services, said method comprising said switch receiving on said line a first identifier defining one of said plurality of terminals and a second identifier defining one of said plurality of service profiles, in response to receipt of said first and second identifiers, said switch enabling for said one terminal a set of call services defined by said one service profile, said switch receiving on said line an identifier defining another of said plurality of terminals and an identifier identical to said second identifier defining said one service profile, in response to receipt of said identifier defining said another terminal and said identifier identical to said second identifier, said switch enabling for said another terminal said set of call services defined by said one service profile, in response to said receipt of said second identifier, determining a third identifier distinguishing said one service profile from any other service profiles defining sets of call services enabled for ones of said plurality of terminals, and determining a fourth identifier distinguishing said one terminal from any other ones of said plurality of terminals for which said set of call services defined by said one service profile is enabled, after determining said third and fourth identifiers, said switch transmitting said third and fourth identifiers to said one terminal and thereafter addressing said one terminal using said third and fourth identifiers, in response to said receipt of said identifier identical to said second identifier, said switch determining a fifth identifier distinguishing said another terminal from any other ones of said plurality of terminals for which said set of call services defined by said one service profile is enabled, and after determining said third and fifth identifiers, said switch transmitting said third and fifth identifiers to said another terminal and thereafter addressing said another terminal using said third and fifth identifiers.

8. A method in accordance with claim 7 further comprising after transmitting said third and fourth identifiers to said one terminal and said third and fifth identifiers to said another terminal, said switch addressing said one and said another terminal collectively using said third identifier and a predefined, global identifier.

9. A method in accordance with claim 7 further comprising after transmitting said third and fourth identifiers to said one terminal and said third and fifth identifiers to said another terminal, said switch addressing said one terminal using said third and fifth identifiers in combination with an interpreter field.

10. An initialization method for a switch connectable via a single line to a plurality of terminals, said switch including means for storing a plurality of service profiles each defining a set of call services, said method comprising said switch receiving on said line a first identifier defining one of said plurality of terminals and a second identifier defining one of said plurality of service profiles, in response to receipt of said first and second identifiers, said switch enabling for said one terminal a set of call services defined by said one service profile, said switch receiving on said line a third identifier defining another one of said plurality of terminals and a fourth identifier defining another one of said plurality of service profiles, in response to receipt of said third and fourth identifiers, enabling for said another terminal a set of call services defined by said another service profile, in response to said receipt of said second identifier, determining a fifth identifier distinguishing said one service profile from any other service profiles defining sets of call services enabled for ones of said plurality of terminals, after determining said fifth identifier, said switch transmitting said fifth identifier to said one terminal and thereafter addressing said one terminal using said fifth identifier, in response to said receipt of said fourth identifier, said switch determining a sixth identifier distinguishing said another service profile from any other service profiles defining sets of call services enabled for ones of said plurality of terminals, after determining said sixth identifier, said switch transmitting said sixth identifier to said another terminal and thereafter addressing said another terminal using said sixth identifier.

11. An initialization method for a switch connectable via a single line to a plurality of terminals, said switch including means for storing a plurality of service profiles each defining a set of call services, said method comprising said switch receiving on said line a first identifier defining one of said plurality of terminals and a second identifier defining one of said plurality of service profiles, in response to receipt of said first and second identifiers, said switch enabling for said one terminal a set of call services defined by said one service profile, said switch receiving on said line a third identifier defining another one of said plurality of terminals and a fourth identifier defining another one of said plurality of service profiles, in response to receipt of said third and fourth identifiers, enabling for said another terminal a set of call services defined by said another service profile, after enabling said set of call services defined by said one service profile for said one terminal and said set of call services defined by said another service profile for said another terminal, said switch addressing said one and said another terminal collectively using a predefined, global identifier defining all service profiles defining sets of call services enabled for ones of said plurality of terminals.

12. An initialization method for a switch connectable via a single line to a plurality of terminals, said switch including means for storing a plurality of service profiles each defining a set of call services, said method comprising said switch receiving on said line a first identifier defining one of said plurality of terminals and a second identifier defining one of said plurality of service profiles, in response to receipt of said first and second identifiers, said switch enabling for said one terminal a set of call services defined by said one service profile, wherein said storing means stores directory number data associating a plurality of directory numbers with said plurality of service profiles, wherein said line comprises a broadcast link and a plurality of point-to-point links, wherein said first identifier defines one of said point-to-point links, wherein said enabling step comprises writing link data to said storing means defining said one point-to-point link as being associated with said one service profile, and wherein said method further comprises the following steps in sequence:

after said enabling step and in response to an incoming call for one of said plurality of directory numbers, said switch reading said directory number data and determining that said one service profile is associated with said one directory number, said switch reading said link data and determining that said one point-to-point link is associated with said one service profile, and said switch transmitting on said one point-to-point link a message concerning said incoming call, and said switch communicating with said one terminal on said one point-to-point link concerning said incoming call.

13. A method in accordance with claim 12 wherein said message comprises an X.25 call request packet.

14. A method in accordance with claim 12 further comprising before said receiving step, said switch assigning said first identifier to said one terminal and transmitting said first identifier to said one terminal.

15. An initialization method for an arrangement comprising a switch connected via a single digital subscriber line to a plurality of terminals, said switch including means for storing a plurality of service profiles each defining a set of call services, said plurality of terminals each including means for storing a service profile identifier defining one of said plurality of service profiles, said method comprising one of said plurality of terminals generating a random number, said one terminal transmitting a first message including said generated random number to said switch, in response to a receipt of said first message, said switch determining a terminal endpoint identifier that is not assigned to any of said plurality of terminals, said switch assigning said determined terminal endpoint identifier to said one terminal, said switch broadcasting on said line a second message including the random number received in said first message and said assigned terminal endpoint identifier, in response to a receipt of said second message, said one terminal determining whether the random number received in said second message is the same as the random number transmitted in said first message, upon determining that said random number received in said second message is the same as said random number transmitted in said first message, said one terminal storing said assigned terminal endpoint identifier, said one terminal transmitting a third message, including said stored terminal endpoint identifier and the service profile identifier stored by said one terminal, to said switch, in response to a receipt of said third message, said switch determining the one of said plurality of service profiles defined by the service profile identifier received in said third message, and upon determining said one service profile defined by said received service profile identifier, said switch enabling for said one terminal a set of call services defined by said one determined service profile, in response to said receipt of said third message, said switch assigning for said one terminal a user service identifier uniquely, among said plurality of terminals, defining said one determined service profile, and a terminal identifier, which in combination with said user service identifier uniquely defines said one terminal among said plurality of terminals, after assigning said user service identifier and said terminal identifier, said switch transmitting a fourth message, including said assigned terminal endpoint identifier and defining said assigned user service identifier and said assigned terminal identifier, to said one terminal, in response to a receipt of said fourth message, said one terminal storing said assigned user service identifier and said assigned terminal identifier, and after transmitting said fourth message, said switch addressing said one terminal using said assigned user service identifier and said assigned terminal identifier.

16. An initialization method for an arrangement comprising a broadband ISDN switch connected via a user network interface to a plurality of terminals, said switch including means for storing a plurality of service profiles each defining a set of call services, said plurality of terminals each including means for storing a service profile identifier defining one of said plurality of service profiles, said method comprising one of said plurality of terminals generating a random number, said one terminal transmitting a first message including said generated random number and the service profile identifier stored by said one terminal to said switch, in response to a receipt of said first message, said switch determining a point-to-point signaling virtual channel and a corresponding point-to-point virtual channel identifier that is not assigned to any of said plurality of terminals, said switch assigning said determined point-to-point virtual channel identifier to said one terminal, said switch determining the one of said plurality of service profiles defined by the service profile identifier received in said first message, and upon determining said one service profile defined by said received service profile identifier, said switch enabling for said one terminal a set of call services defined by said one determined service profile, said switch determining a broadcast signaling virtual channel and a corresponding broadcast virtual channel identifier to be used to broadcast messages for said one determined service profile, said switch determining whether said broadcast signaling virtual channel identifier has been assigned to said one determined service profile, upon determining that said broadcast signaling virtual channel identifier has not been assigned to said one determined service profile, said switch assigning said broadcast virtual channel identifier to said one determined service profile, said switch assigning for said one terminal a terminal identifier uniquely, among said plurality of terminals, defining said one determined service profile, and which in combination with said broadcast virtual channel identifier uniquely defines said one terminal among said plurality of terminals, after assigning said terminal identifier, said switch transmitting a second message, including said random number, said assigned point-to-point virtual channel identifier, said assigned broadcast virtual channel identifier, and said assigned terminal identifier, to said one terminal, in response to a receipt of said second message, said one terminal determining whether the random number received in said second message is the same as the random number transmitted in said first message, upon determining that said random number received in said second message is the same as said random number transmitted in said first message, said one terminal storing said assigned point-to-point virtual channel identifier, said assigned broadcast virtual channel identifier, and said assigned terminal identifier, after transmitting said second message, said switch addressing said one terminal using said assigned broadcast virtual channel identifier and said assigned terminal identifier.

17. An initialization method for a terminal connectable with one or more other terminals via a single line to a switch, said switch including means for storing a plurality of service profiles each defining a set of call services, said method comprising said terminal transmitting on said line a first identifier defining said terminal and a second identifier defining one of said plurality of service profiles, and after said transmission of said first and second identifiers, said terminal cooperating with said switch to provide a set of call services defined by said one service profile, after transmitting said second identifier, said terminal receiving a message containing a third identifier distinguishing said one service profile from any other service profiles defining sets of call services enabled for ones of said plurality of terminals, and in response to receipt of said third identifier, said terminal responding to messages addressed by said third identifier.

18. A switching system connectable via a single line to a plurality of terminals, said system comprising means for storing a plurality of service profiles each defining a set of call services, control means for controlling said switching system to provide call services for said plurality of terminals, wherein said control means is operable under the control of a program for controlling the following operation:

responsive to receipt of a first identifier defining one of said plurality of terminals and a second identifier defining one of said plurality of service profiles, enabling for said one terminal a set of call services defined by said one service profile, wherein said control means is further operable under the control of said program for controlling the following operations:

responsive to receipt of said second identifier, determining a third identifier distinguishing said one service profile from any other service profiles defining sets of call services enabled for ones of said plurality of terminals, and after determining said third identifier, transmitting said third identifier to said one terminal and thereafter addressing said one terminal using said third identifier.

* * * * *